(12) United States Patent
Brewer et al.

(10) Patent No.: US 12,608,276 B2
(45) Date of Patent: Apr. 21, 2026

(54) MEMORY FAULT TOLERANCE USING RAID

(71) Applicant: Micron Technology, Inc., Boise, ID (US)

(72) Inventors: Tony M. Brewer, Plano, TX (US); Craig Warner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 71 days.

(21) Appl. No.: 18/733,609

(22) Filed: Jun. 4, 2024

(65) Prior Publication Data

US 2025/0045165 A1 Feb. 6, 2025

Related U.S. Application Data

(60) Provisional application No. 63/517,658, filed on Aug. 4, 2023, provisional application No. 63/517,660, filed on Aug. 4, 2023, provisional application No. 63/517,653, filed on Aug. 4, 2023, provisional application No. 63/517,632, filed on Aug. 4, 2023, provisional application No. 63/517,647, filed on Aug. 4, 2023.

(51) Int. Cl.
G06F 11/00 (2006.01)
G06F 11/10 (2006.01)
G06F 11/14 (2006.01)
G06F 11/20 (2006.01)

(52) U.S. Cl.
CPC ...... *G06F 11/1088* (2013.01); *G06F 11/1435* (2013.01); *G06F 11/2017* (2013.01); *G06F 2201/805* (2013.01)

(58) Field of Classification Search
CPC ............. G06F 11/1088; G06F 11/1435; G06F 11/2017; G06F 2201/805
See application file for complete search history.

(56) References Cited

U.S. PATENT DOCUMENTS 9,842,128 B2 * 12/2017 Talagala .................. G06F 3/064
2013/0019062 A1 * 1/2013 Bennett ................. G06F 3/0659
711/E12.019
2022/0261314 A1 * 8/2022 Inglis .................. G06F 11/1088

* cited by examiner

*Primary Examiner* — Jason B Bryan
(74) *Attorney, Agent, or Firm* — Wood IP, LLC; Theodore A. Wood

(57) ABSTRACT

Systems, methods, and computer-readable storage devices can include fabric networks for isolating and correcting failures in the fabric network and device failures. The fabric network connects to a group of devices and a host. The group of devices includes at least a target data device, other data devices, and a parity device. A redundant array of independent devices (RAID) engine, which is coupled to the one group of devices, performs an access operation. The fault tolerant engine is provided in a leaf switch of the fabric network. A routing processor determines a path for a request received from the host to the target data device. The routing processor is coupled to the fault tolerant engine, and the routing processor is provided in the leaf switch.

36 Claims, 29 Drawing Sheets

Table 1

Quick Consistency Recovery Technique

| Lock Bit State in Media? | Data and Parity Consistent? | Action |
|---|---|---|
| Not Set | Ignore | None |
| Set | Parity Device Data Equals XOR of All Data Device Data | Clear Lock and Re-Write Parity Data |
| Set | Parity Device Data Does Not Equal XOR of All Data Device Data | Clear Lock and Write Parity Generated from XORing Data |

FIG. 7B

Table 2

| RAID Op | Failure | Target | Action | Inform Fabric Manger |
|---|---|---|---|---|
| Read | LinkDown | x | Rebuild; Return Good Data, If Poison again after rebuild; return Poison | Rebuild |
| | MediaError | x | Return Data (Optional ReRead) | Media Error |
| | HostPoison | x | Return Data with Poison | Host Poison |
| Write | Invalid | ReadParity | Perform Rebuild | |
| | Link Down | ReadParity & ~HotSpareMatch | Declare Parity Dead; Write to device | Parity may be Dead; Parity not Updated |
| | Link Down | ReadParity & HotSpareMatch | Declare Parity Dead; Write to device & Parity to HotSpare | Parity may be Dead |
| | Link Down | ReadTarget & ~HotSpareMatch | Rebuild; Update Parity; Don't write to device | Target may be Dead |
| | Link Down | ReadTarget & HotSpareMatch | Rebuild; Update Parity & Write to Spare | |
| | MediaError | ReadParity & ~HotSpareMatch | ReRead, if not corrected, Declare Parity Dead; Write to Device | Parity May be Dead; Parity not Updated |
| | MediaError | ReadParity & HotSpareMatch | ReRead if not corrected Declare Parity Dead; Write to Device & Parity to HotSpare | Parity May be Dead |
| | MediaError | ReadTarget & ~HotSpareMatch | ReRead, if not corrected, Rebuild; Write to Parity | Rebuild; Device Not written |
| | MediaError | ReadTarget & HotSpareMatch | ReRead; if not corrected, Rebuild Write Device & Parity to Host Spare | Rebuild |
| Rebuild | Link Down; Media Error | Invalid | x | Fail Rebuild | Rebuild Failure |

FIG. 10

| Lock Pipeline Results | Description |
|---|---|
| LockNoCnflt | The Lock Pipeline detected no active request to the Parity group targeted by this Lock Request. The request is added to the Active Lock Request tracker. A Memory Data packet is returned to the requestor after the Parity Data is read. |
| LockCnflt | The Lock Pipeline detected active request to the Parity group targeted by this Lock Request. The request is NOT added to the Active Lock Request tracker. Instead, the lock request is added to the conflict list. Eventually the Conflicting request will complete, the request will be re-passed though the lock pipeline, and the request will get a LockNoCnflt response. |
| LockHitTimeoutNoPreservedData | The Lock Pipeline detected a match with a timed-out request to the cache line location targeted by this Lock Request. The request timeout bit is cleared in the Active Lock Request tracker, so no other request can reclaim this request. A Memory Data packet is returned to the requestor after the Parity Data is read. |
| LockHitTimeoutPreservedData | Same as above. The Lock Fault Tolerant Engine is informed that the Lock Controller as the only copy of the original home memory location. The HomeFault Tolerant Engine fetches this data from the Lock Controller. |

FIG. 15B

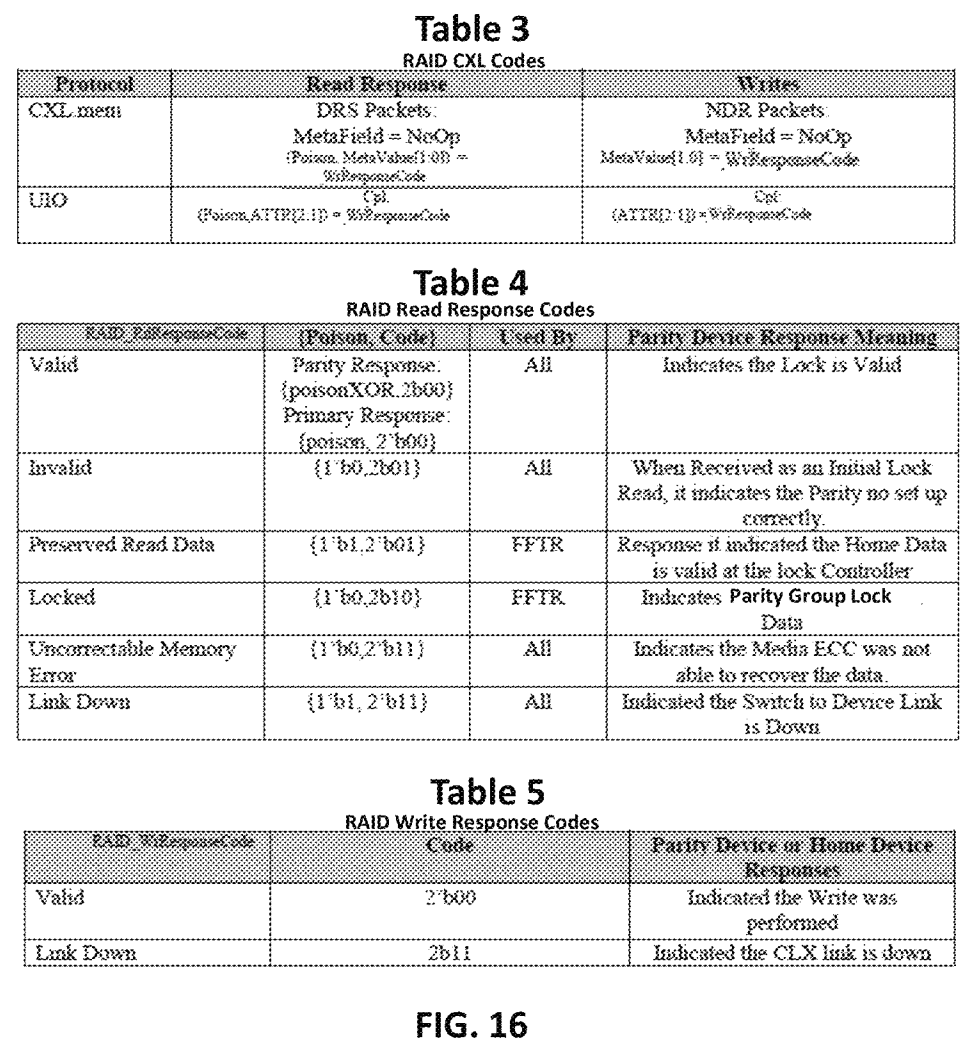

Table 3

RAID CXL Codes

| Protocol | Read Response | Write |
|---|---|---|
| | | |
| CXL.mem | DRS Packets: MetaField = NoOp {Poison, MetaValue[1:0] = %Response%Code | NDR Packets: MetaField = NoOp MetaValue[1:0] = %WriteResponse%Code |
| UIO | {Poison,%UIORd.U} = %%Response%Code | {UIOWr.U} = %WriteResponse%Code |

Table 4

RAID Read Response Codes

| RAID RdResponse | Poison Code | Used By | Parity Device Response Meaning |
|---|---|---|---|
| Valid | Parity Response {poisonXOR,2'b00} Primary Response {poison, 2'b00} | All | Indicates the Lock is Valid |
| Invalid | {1'b0,2'b01} | All | When Received as an Initial Lock Read, it indicates the Parity no set up correctly |
| Preserved Read Data | {1'b1,2'b01} | FFTR | Response if indicated the Home Data is valid at the lock Controller |
| Locked | {1'b0,2'b10} | FFTR | Indicates Parity Group Lock Data |
| Uncorrectable Memory Error | {1'b0,2'b11} | All | Indicates the Media ECC was not able to recover the data |
| Link Down | {1'b1,2'b11} | All | Indicated the Switch to Device Link is Down |

Table 5

RAID Write Response Codes

| RAID WrResponse | Code | Parity Device at Home Device Response |
|---|---|---|
| Valid | 2'b00 | Indicated the Write was performed |
| Link Down | 2'b11 | Indicated the CLX link is down |

FIG. 16

- Completion status encoding
  - CXL.mem
    - RAID error responses will be encoded as
      - Meta Field ← NoOp
      - Meta Value ← error code
  - CXL.UIO
    - RAID error responses will be encoded as
      - ATTR[2:1] ← error code

| Poison | MetaValue[1:0]/ Attr[2:1] | Response Code |
|--------|---------------------------|---------------|
| 0 | 0 | Valid |
| 0 | 1 | Invalid |
| 0 | 2 | Locked |
| 1 | 0 | Meta State Poison |
| 1 | 1 | Uncorrectable memory |
| 1 | 2 | Link Down |

Table 6

FIG. 17

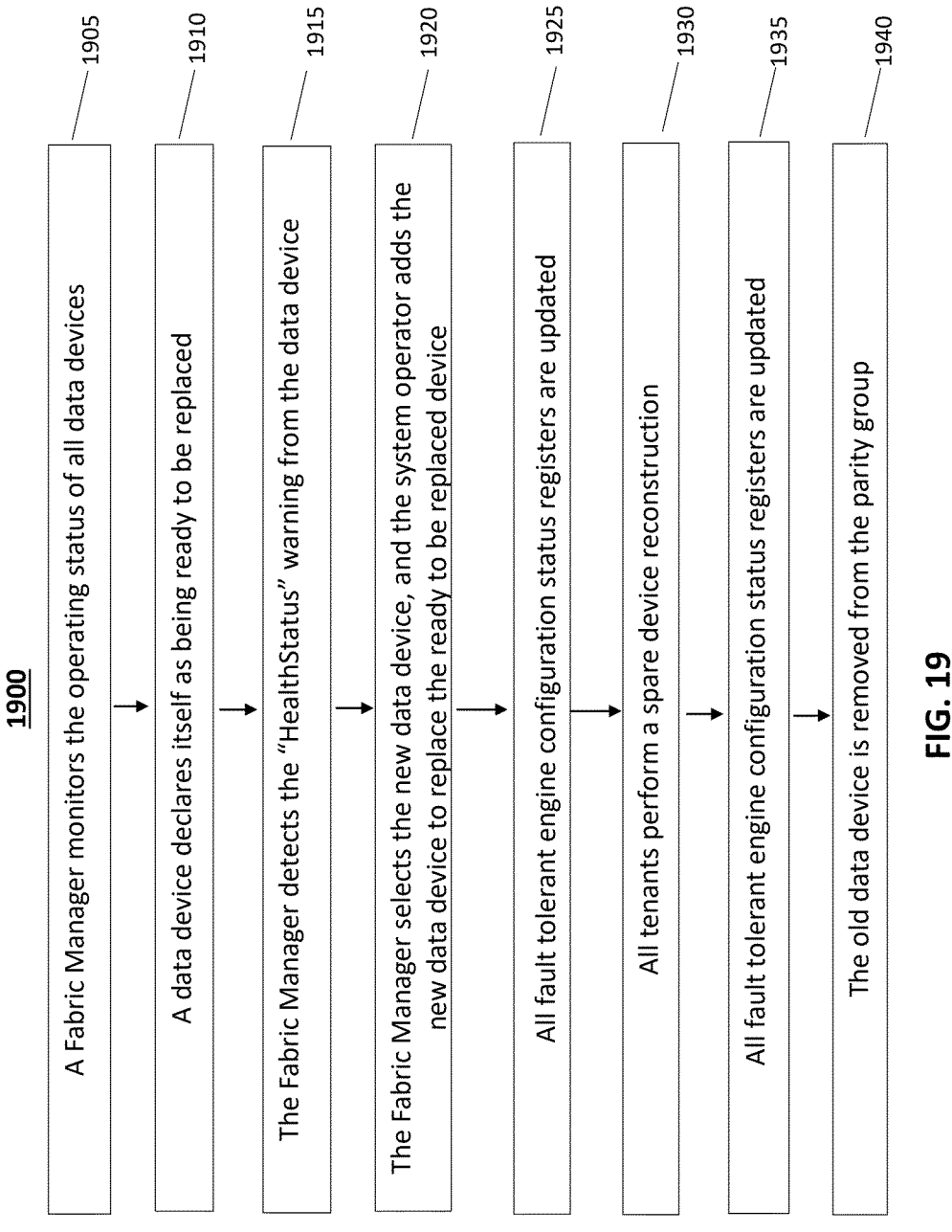

1900

1905 — A Fabric Manager monitors the operating status of all data devices

1910 — A data device declares itself as being ready to be replaced

1915 — The Fabric Manager detects the "HealthStatus" warning from the data device 1920 — The Fabric Manager selects the new data device, and the system operator adds the new data device to replace the ready to be replaced device 1925 — All fault tolerant engine configuration status registers are updated 1930 — All tenants perform a spare device reconstruction 1935 — All fault tolerant engine configuration status registers are updated 1940 — The old data device is removed from the parity group

FIG. 19

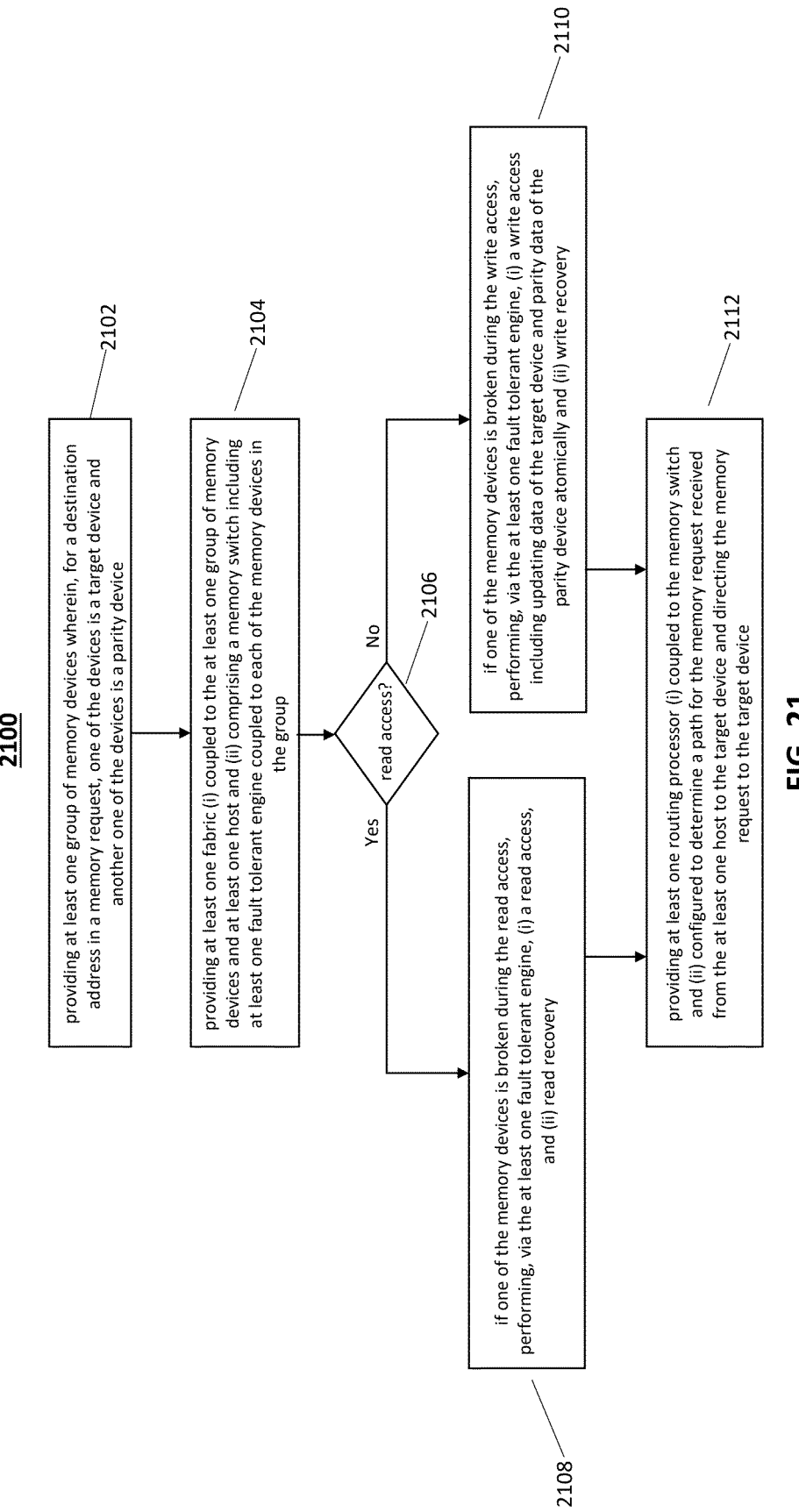

2100 providing at least one group of memory devices wherein, for a destination address in a memory request, one of the devices is a target device and another one of the devices is a parity device — 2102 providing at least one fabric (i) coupled to the at least one group of memory devices and at least one host and (ii) comprising a memory switch including at least one fault tolerant engine coupled to each of the memory devices in the group — 2104 read access? — 2106

Yes

No if one of the memory devices is broken during the read access, performing, via the at least one fault tolerant engine, (i) a read access, and (ii) read recovery — 2108 if one of the memory devices is broken during the write access, performing, via the at least one fault tolerant engine, (i) a write access including updating data of the target device and parity data of the parity device atomically and (ii) write recovery — 2110 providing at least one routing processor (i) coupled to the memory switch and (ii) configured to determine a path for the memory request received from the at least one host to the target device and directing the memory request to the target device — 2112

FIG. 21

MEMORY FAULT TOLERANCE USING RAID

CROSS-REFERENCE TO RELATED APPLICATIONS

This application claims benefit to U.S. Provisional Patent Application Nos. 63/517,647, 63/517,653, 63/517,632, 63/517,658, 63/517,660, all filed Aug. 4, 2023, the disclosures of which are incorporated herein in their entirety, by reference.

FIELD OF TECHNOLOGY

The present disclosure relates generally to fabric networks, and more generally to isolating and correcting failures in a fabric network.

BACKGROUND

Fabric interconnect systems connect multiple components by providing a fabric over which these components can communicate. The fabric interconnect systems provide peer-to-peer communications, allowing decentralized communication between the components. There can be many dependencies between interconnected components in fabric interconnect systems. Because of these dependencies, the failure of one component may trigger a fault condition in another component.

Fabric interconnect systems may have numerous sources of faults, ranging from software failures to hardware failures. A system's dependability is often characterized by its level of fault tolerance, safety, and reliability. Fault tolerance has traditionally been associated with defining a level of redundancy for the system components and/or connectivity between those components.

Given the aforementioned deficiencies, there is a need for fabric interconnect systems that are more adaptable to their environment, enabling prompt detection and efficient containment of faults without requiring the whole system to shut down. There is a further need for a fault tolerant system wherein the hardware and/or software systems may be applied to a memory device in a cluster to maintain normal cluster operation even when a component fails without warning. There is an additional need for a fault tolerant system that supports global fabric attached memory (GFAM) devices that allow different types of memory to be directly attached and made accessible to multiple processor nodes.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for the purpose of illustrating the embodiments and are not to be construed as limiting the disclosure. Given the following enabling description of the drawings, the novel aspects of the present disclosure should become evident to a person of ordinary skill in the relevant art(s).

FIG. 7B is a table illustrating a quick consistency recovery algorithm according to an exemplary embodiment of the present disclosure.

FIG. 10 illustrates a table showing an example of error handling algorithms for responding to various read and write operations to initiate a rebuild according to the present disclosure.

FIG. 15B illustrates example results of a conflict check according to the present disclosure.

FIG. 16 illustrates tables of read and write responses according to the present disclosure.

FIG. 17 is a table illustrating Compute Express Link (CXL) proprietary extensions according to an exemplary embodiment of the present disclosure.

FIG. 19 shows an example flow chart for the preemptive maintenance process depicted in FIGS. 18A-18C.

FIG. 21 illustrates a flow chart of an exemplary method of practicing an embodiment of the present disclosure.

DETAILED DESCRIPTION

Figure 1A:
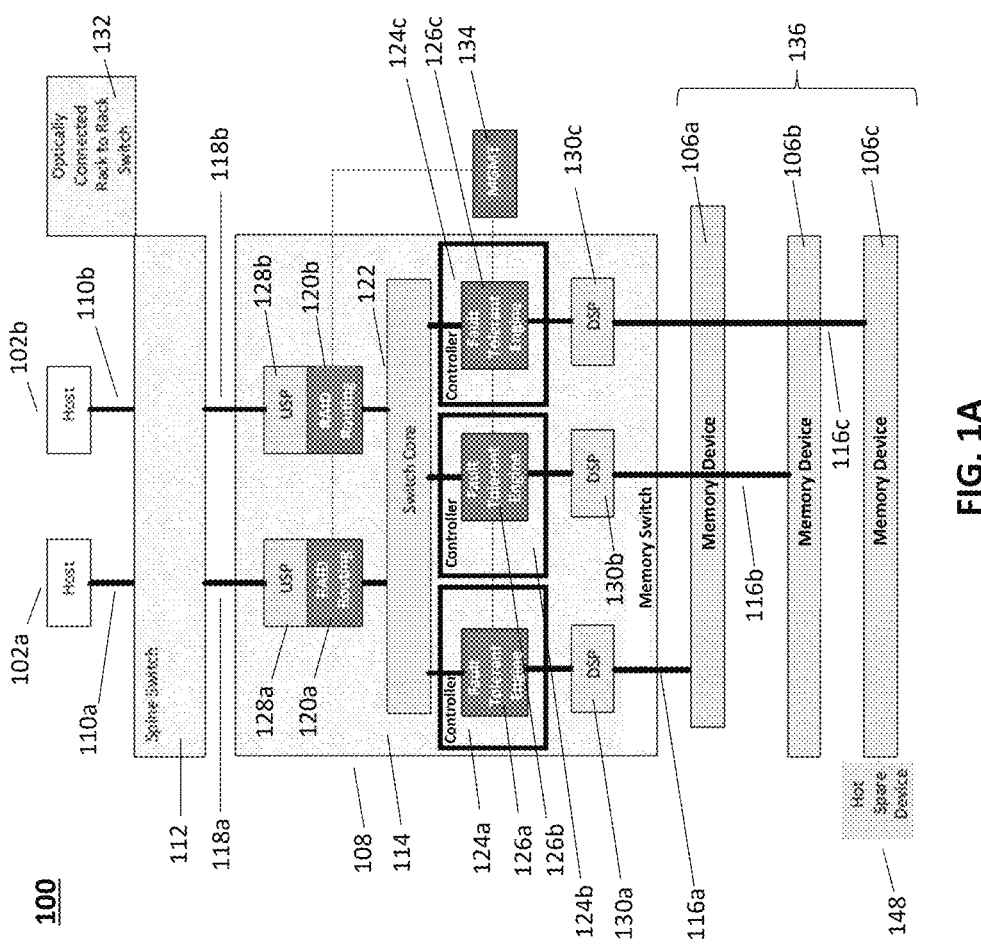
FIG. 1A illustrates a functional block diagram in the form of a cluster topology with a redundant array of independent devices (RAID) architecture having a single switch topology in accordance with embodiments of the present disclosure.

The present disclosure addresses the need for isolating and correcting failures in a fabric network. Various embodiments may include a dynamically configurable fabric network.

RAID devices, which are understood in the art as being memory devices that combine multiple physical drives into a single logical unit, are capable of implementing data recovery using a checksum. This checksum can be the Exclusive OR (XOR) of data lines in a checksum group. In some embodiments, the term RAID refers to implementation within the context of CXL devices (i.e., memory devices that implement the CXL protocol). In some embodiments the term refers to an implementation of a CXL device fault tolerance using RAID logic. In other embodiments, the term RAID refers to fabric fault tolerance in a cluster using a RAID design. Systems, apparatuses, and methods related to a RAID architecture are described herein. In a basic design, the RAID architecture creates redundancy in memory, so that a single failure of a device or its associated components (like its power delivery system) can be tolerated.

Although embodiments are not limited in this regard, one example may be different serial interconnect protocols that are used to interconnect or couple devices. Available protocols that may be used in some embodiments include a peripheral component interconnect express (PCIe) protocol such as in accordance with any existing version of a PCIe specification or any future update, version, or variation thereof. Other protocols may include a CXL protocol such as in accordance with any existing version of a CXL specification such as the CXL Specification version 1.0/1.1, CXL specification version 2.0, and CXL specification version 3.0, any future update, version, or variation thereof. Of course, other protocols are possible.

In some embodiments, a memory system can be a CXL compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space (of a host) and memory on attached devices, which allows resource sharing for higher performance, reduced software stack complexity, and lower overall system cost.

CXL is designed to be an industry open interconnect standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The present disclosure includes apparatuses and methods related to a CXL 3.0 technology. The CXL 3.0 specification expands on the previous versions CXL 1.0/1.1, and CXL 2.0. The CXL 3.0 focuses on major improvements for the interconnect standard. The CXL 3.0 greatly expands the logical capabilities of the standard, allowing for complex connection topologies and fabrics. The CXL 3.0 extends the topology from the scale of servers to the scale of a rack. CXL switches now can support any array of topologies. A rack or many racks of servers can now be networked with leaf and spine topologies. The spine-leaf architecture routes traffic through top-level spine nodes to lower-level (leaf) nodes that can contain hosts/devices. These changes dramatically expand the potential size of a CXL network from a few servers to many racks of servers.

The CXL 3.0 enables peer-to-peer communication so that devices can directly access each other's memory without having to go through a host, using enhanced coherency semantics to inform each other of their state. CXL 3.0 introduces memory sharing that allows every host to see the most up to date data at that location, without the need for software-managed coordination. This allows system designs to build clusters of machines to solve large problems through shared memory constructs.

Multi-level switching is enabled by CXL 3.0, which allows for multiple layers of switches wherein switches feed into other switches. This vastly increases the kinds and complexities of networking topologies supported. CXL 3.0 introduces fabric capabilities that enable non-tree topologies, such as rings, meshes, and other fabric setups. The CXL fabric can support up to 4096 nodes that can communicate with each other using a new scalable addressing mechanism called Port Based Routing (PBR).

With CXL 3.0, there is support for GFAM, which allows different types of memory to be directly attached and made accessible to multiple processor nodes. The GFAM architecture expands the CXL's memory expansion board by disaggregating memory from a given host and implements a shared large memory pool. A GFAM device may also be referred to as a GFAM memory device (GFD), or memory device. These terms are used interchangeably herein. A GFAM device is similar to a traditional CXL Type-3 device, except it can be accessed by multiple nodes (up to 4095) in flexible ways using PBR.

Some embodiments are directed to a RAID architecture capable of operating with all types of CXL 3.x GFAM devices with no modifications. Optionally, CXL GFAM devices can be configured to implement enhanced read request responses which will help to increase the availability of clusters implementing a basic RAID architecture. In other words, the RAID architecture can make the GFAM device highly available. In various embodiments, these CXL design changes are optional.

Some embodiments are directed to a RAID architecture that includes hardware and software features which may be implemented in CXL switches or software devices, known as CXL fabric managers (FMs), for implementing memory RAID in a cluster. By way of background, in CXL, a fabric manager is a resource management capability (i.e., a trusted element of the fabric) configured to manage access to, and memory resources within, the fabric. In the embodiments, for example, the fabric manager may be implemented in hardware, firmware, or software, or combinations thereof.

Some embodiments are directed to a fabric fault tolerant RAID design wherein the basic RAID architecture can be extended to be resilient to CXL switch failures as well as device failures in a RAID fabric fault tolerant CXL device. This fabric fault tolerant CXL device can include a memory protocol unit (MPU) and a sophisticated lock management block. More specifically, only parity groups get locked. A parity group is N data cache lines (or check lines) and one parity cache line.

Although the present disclosure uses the term cache line, it is acknowledged that the terms checkline and cache line may be used interchangeably. The RAID architecture creates redundancy in memory so that the failure of a single CXL device or its associated components (like its power delivery system) can be tolerated. In some embodiments, the RAID architecture only tolerates one device failure per parity group at a time, but via the online replacement mechanism and prompt servicing of the cluster, this limitation can be overcome.

Some embodiments of the present disclosure relate to a mechanism to support a redundant array of independent CXL GFAM devices, which can provide a number of significant advantages. The mechanism can include a fault tolerant engine within a CXL leaf switch. The fault tolerant engine can receive read/write requests from host processors and perform a series of operations to a group of CXL GFAM devices to complete the host's request. These advantages include, but are not limited to, the ability to support N+1 GFAM having N+1 redundancy, support single switch parity group, and support single fabric parity groups (without MPU).

The advantages also include support redundant fabric parity groups (with or without MPU), support active-active redundant switch fabric, support identification and restoration of parity group checksum in all scenarios, support in memory atomic operations via fault tolerant engine, and support masked write operations. The result is that these advantages can maximize throughput for memory regions with RAID support and minimize latency for memory regions with RAID support.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The embodiments described herein relate to a fabric network that supports a spine-leaf topology that consists of any combination of leaf switches, including a single switch or multiple spine and leaf switches. Some embodiments described herein provide a fabric network that may consist of a single switch topology, a multiple spine and leaf topology including redundant connections, or a multiple spine and leaf topology including redundant connections with a failover path. It is to be understood that these are only examples and that the embodiments described herein may be implemented in different types of networks to manage any type of content.

FIG. 1A is an example of a basic RAID system 100 having a cluster topology. In general, computer clusters, which are groups of linked computers that can work together as a single system, may be linked by a high-speed network that permits the sharing of computer resources and memory. Data transfers to and from the computers may be performed through a high-speed PCIe switch bus.

FIG. 1A illustrates a block diagram of the basic RAID system 100 in accordance with an embodiment. More specifically in FIG. 1A, the RAID system 100 may be any type of computing platform, managing from a relatively small device such as a portable computer or another personal computer to larger devices, such as servers and data center-based implementations.

In FIG. 1A, the RAID system 100 includes one or more host devices 102a, 102b and one or more memory devices 106a, 106b, 106c, such as fabric fault tolerant memory devices. Collectively, the one or more memory devices 106a, 106b, and 106c may also be referred to herein as a group of memory devices or a part of a group of memory devices. In alternative embodiments, there may be multiple groups of memory devices in the system 100. The system 100 also includes a fabric 108. The host devices 102a and 102b and the memory devices 106a, 106b, and 106c can be coupled to the fabric 108. The fabric 108 is capable of carrying bidirectional traffic from the host devices 102a, 102b to the one or more of the memory devices 106a, 106b, 106c, and vice versa.

The host devices 102a, 102b can be a personal laptop computer, a desktop computer, a digital camera, a mobile telephone, a memory card reader, or an Internet-of-Things (IoT) enabled device, among various other types of systems. The host devices 102a, 102b can include a number of processing resources (e.g., one or more processors, micro-processors, or some other type of controlling circuitry) capable of accessing a memory system. The host devices 102a, 102b can include a system motherboard and/or back-plane and can include a number of processing resources (e.g., one or more processors, microprocessors, or some other type of controlling circuitry). In an embodiment, the host components can include CXL servers, all local memory, local storage, and I/O cards. The host components can also include the power delivery system inside the server. The host devices may be physical, virtual (e.g., implemented in software), or a combination of both.

The host devices 102a, 102b, and the fabric 108 are connected via connections 110a and 110b. Multiple connection and transaction layers can be provided in an interface to provide for communication via I/O connections 110a and 110b.

Coupling the host devices 102a and 102b to the fabric 108 can include, for example, a physical interface employing a suitable protocol (e.g., a data bus, an address bus, and a command bus, or a combined data/address/command bus). Such protocol may be custom or proprietary or may employ a standardized protocol, such as PCIe, CXL, Gen-Z, cache coherent interconnect for accelerators (CCIX), or the like. Concerning the CXL transaction layers, various components can be included to enable transaction layer processing for PCIe/CXL.io communications and CXL.cache and CXL.memory transactions.

In one embodiment, a PCIe 6.0 interface, which is used by the CXL 3.0 specification, can be coupled to the connection 110a, and 110b. In some embodiments, the fabric 108 can receive access requests involving at least one of the memory devices 106a, 106b, and 106c via the PCIe 6.0 interface according to a CXL protocol. The fabric 108 can receive data from the hosts 102a and 102b through connections 110a and 110b.

Referring to FIG. 1A, the fabric 108 comprises a single switch topology which includes the single spine switch 112, and a single leaf switch 114. The spine switch 112 is connected to the leaf switch 114 via connections 118a and 118b. In an embodiment, two levels of switching are provided inside of a rack of equipment and are optically connected to racks via rack switches 132. At the top level, the spine switch 112 routes data traffic to the lower-level leaf switch 114. The leaf switch 114 may be in communication with one or more memory devices 106a, 106b, and 106c via a plurality of connections 116a, 116b, and 116c. While FIG. 1A depicts two host devices 102a, 102b and three memory devices 106a, 106b, 106c, it is understood that more or fewer host devices 102 and memory devices 106 may be used.

In the exemplary embodiment shown in FIG. 1A, the leaf switch 114 is configured as a leaf switch with RAID comprising several components including routing processors or memory request routing blocks (e.g., RAID routing blocks) 120a, 120b. The RAID routing blocks 120a, 120b analyze the data, or data packets, to find the optimum upstream communications path to ensure good data transfer. The leaf switch 114 also includes a switch (e.g., switch core) 122, RAID controllers 124a, 124b, 124c, fault tolerant engines 126a, 126b, 126c, upstream ports (USPs) 128a, 128b, and downstream ports (DSPs) 130a, 130b, 130c. The RAID routing blocks 120a and 120b are associated respectively with each USP 128a, 128b. The fault tolerant engines 126a, 126b, and 126c respectively correspond with the DSPs 130a, 130b, and 130c.

By way of example and as described herein, the RAID routing block 120a and the RAID routing block 120b may be collectively referred to as RAID routing block(s) 120. The RAID controller 124a, the RAID controller 124b, and the RAID controller 124c may be collectively referred to as RAID controller(s) 124; the fault tolerant engine 126a, the fault tolerant engine 126b, and the fault tolerant engine 126c may be collectively referred to as fault tolerant engine(s) 126; and the USP 128a and the USP 128b may be collectively referred to as USP(s) 128. This scheme applies to other components and FIGURES discussed throughout.

As background, and as understood by a person of ordinary skill in the art, a fault tolerant engine is a component within a RAID system that distributes data among the different GFAM devices and optimizes RAID logic to achieve peak performance. In the embodiments, the fault tolerant engine may be implemented in software, firmware, hardware, and/ or combinations thereof.

As used herein, a USP is a device that provides a communication path for data flow between a controller within the RAID system, such as a fault tolerant engine, and an upper-level device, such as an external computer. A DSP is a device that provides a communication path for data flow between the fault tolerant engine and a lower-level device within the RAID system, such as a memory device or a memory device.

Figure 1B:
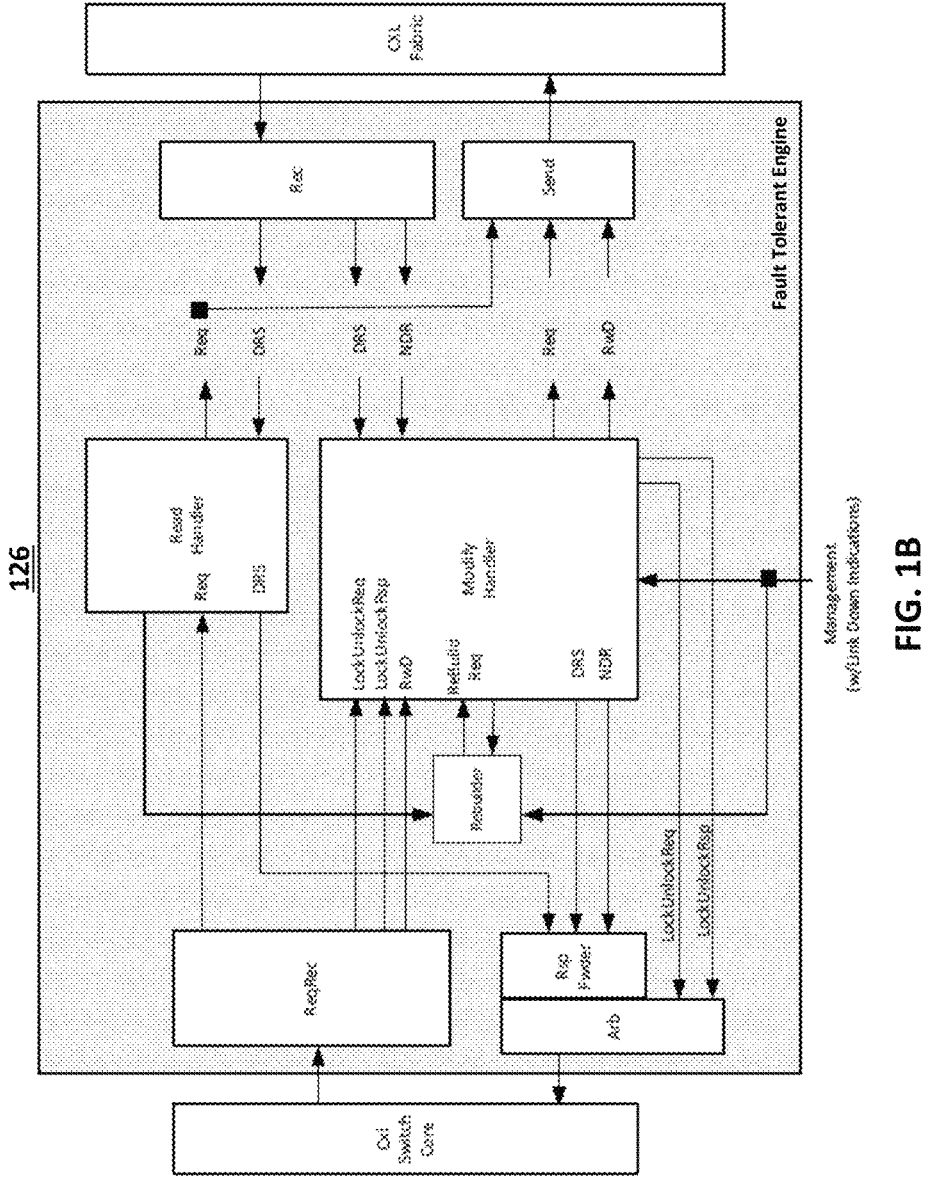
FIG. 1B illustrates an exemplary detailed block diagram of a fault tolerant engine as depicted in FIG. 1A.

FIG. 1B is a detailed illustration of a single fault tolerant engine 126, which may represent one or more of the fault tolerant engines 126a, 126c depicted in FIG. 1A.

As shown in FIG. 1A, in fabric 108, the spine switch 112 is connected to the leaf switch 114 to route communications between one or more hosts 102a, 102b, memory devices 106a, 106b, 106c, and other network elements. In the fabric 108, the spine switch 112 may be in communication with any number of hosts 102a, 102b, and the leaf switch 114 may be in communication with any number of memory devices 106a, 106b, 106c.

Various connections 118a, 118b may be used to connect the spine switch 112 and the leaf switch 114. One or more connections 118a, 118b may operate as an uplink for transmitting data from the leaf switch 114 to the spine switch 112, a downlink for transmitting data from the spine switch 112 to the leaf switch 114, or both uplink and downlink. The term "link" as used herein may refer to one or more uplinks, downlinks, link groups, or any other communication pathway that may exist between the spine switch and leaf switch, or any network elements.

The spine switch 112 and leaf switch 114 may comprise any number of uplink and downlink ports operable to support connectivity to various transmission rates. Although the description herein refers to spine switches and leaf switches, various nodes including switches, routers, or other network devices comprising network switching or routing elements configured to perform forwarding functions may be envisioned.

In the example embodiment of the RAID switch shown in FIG. 1A, a RAID routing block 120a, 120b is associated with each USP 128a, 128b. A fault tolerant engine block 126a, 126b, 126c is associated with each DSP 130a, 130b, 130c. The RAID routing block 120a, 120b is positioned in the switch between the USP 128a, 128b, and the switch core 122. The switch core 122 alters the routing of the data packets, so all requests are sent to the correct RAID controller 124a, 124b, 124c.

As noted above, the RAID routing block 120a, 120b analyzes data packets to find the best path to ensure good data transfer. In an embodiment, the RAID routing block 120a, 120b uses the destination port in the request packet, the address in the packet, and configuration status registers (CSRs) defining the interleave of the parity group to determine the destination fault tolerant engine for the request. This destination is referred to as the primary (or home) fault tolerant engine.

The RAID routing block 120 and fault tolerant engine 126 are configured by an FM 134. The FM 134 is configured as the management service to support the management of the network of the fabric 108. The network of the fabric 108 may include network devices, such as switches, routers, servers, and the like, and their connectivity. The FM 134 allows for complex network fabrics to be reconfigured, updated, or analyzed for performance.

The FM 134 involves fault, configuration, accounting, performance, and security management of the network fabric 108. In some examples, FM 134 may allow for maintenance and analysis of individual switches. In other examples, the FM 134 may allow for the creation, installation, and/or maintenance of fabric-wide switch configurations. Components of the FM 134 may be implemented in software, hardware, or a combination thereof. In some embodiments, the FM 134 may be a CXL FM. In embodiments of the single switch as shown in FIG. 1A, the FM may be optional.

In embodiments, the system 100 employs a plurality of distributed RAID controllers 124a, 124b, 124c for performing multiple read and write operations. In some embodiments, each RAID controller 124a, 124b, 124c may include a corresponding fault tolerant engine 126a, 126b, 126c. As appropriate to the context, the RAID controller and fault tolerant engine may be referenced interchangeably herein. The fault tolerant engines 126a, 126b, 126c can be configured to provide data protection that tolerates predetermined device failures for data encoded across numerous devices. For example, the fault tolerant engines 126a, 126b, and 126c can be configured to only tolerate one device failure per parity group 136 at a time. In some embodiments, the group of memory devices may include one or more parity groups, herein after referred to as the parity group 136.

While servicing the read and write operations, the RAID controllers 124a, 124b, 124c may perform RAID rebuild operations. In various embodiments, there are two different kinds of rebuilds: rebuilds for reads and rebuilds for writes (described below).

The RAID controller 124 is capable of implementing the logic embedded in the fault tolerant engine 126. The fault tolerant engine 126 can be preprogrammed with RAID encoding error detection and correction across a wide range of RAID coding schemes. Many of the RAID schemes employ an error protection scheme commonly referred to as "parity" which is a widely used method in information technology to provide for tolerance in a given set of data. For example, RAID is essentially a stripe array with fault tolerance (in the form of distributed "parity").

In the RAID data structure, data is striped across the hard drives, with a dedicated parity block for each stripe. A percentage of each member of the array is reserved for parity calculation; the RAID array will generate unique meta-data (data only readable by the RAID controller 124) known as "parity bits", whenever usable data is written to a RAID array. The parity bits are distributed across all members of the array and can be used to reconstruct usable data if any one of the devices fails.

The parity blocks are computed by running the XOR comparison on each block of data in the stripe. The parity is responsible for the data fault tolerance. In operation, according to embodiments of the present disclosure, if one device fails, a new device can be put in place and the fault tolerant engine can rebuild the data automatically using the parity data.

In various embodiments, the memory devices 106a, 106b, and 106c may be CXL devices (i.e., memory devices that implement the CXL protocol), a GFAM, a memory device, or a combination thereof. The memory devices 106a, 106b, and 106c can connect to the leaf switch 114 at the respective DSPs 130a, 130b, 130c via connections 116a, 116b, 116c, respectively. In some embodiments, the RAID controller 124 can be configured as a CXL interface controller that enables communication with one or more memory devices 106a, 106b, 106c, such as CXL memory devices, over CXL connections 116a, 116b, 116c to which the memory devices 106a, 106b, 106c are connected. The memory devices 106a, 106b, 106c are capable of communication via CXL protocols.

Figure 13:
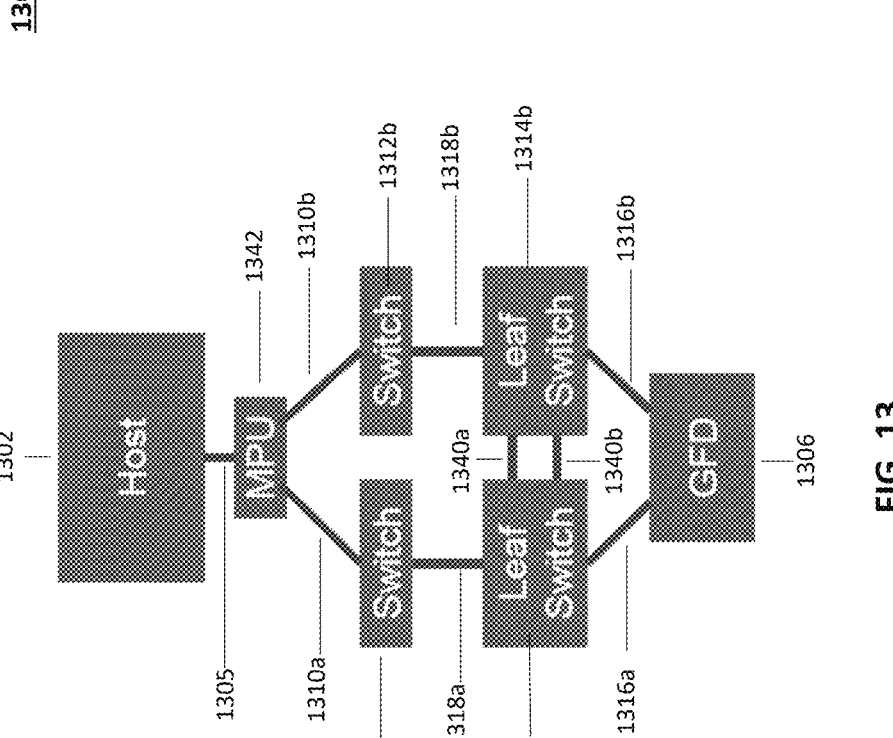
FIG. 13 illustrates a simplified version of a fabric fault tolerant RAID design according to the present disclosure.
Figure 14:
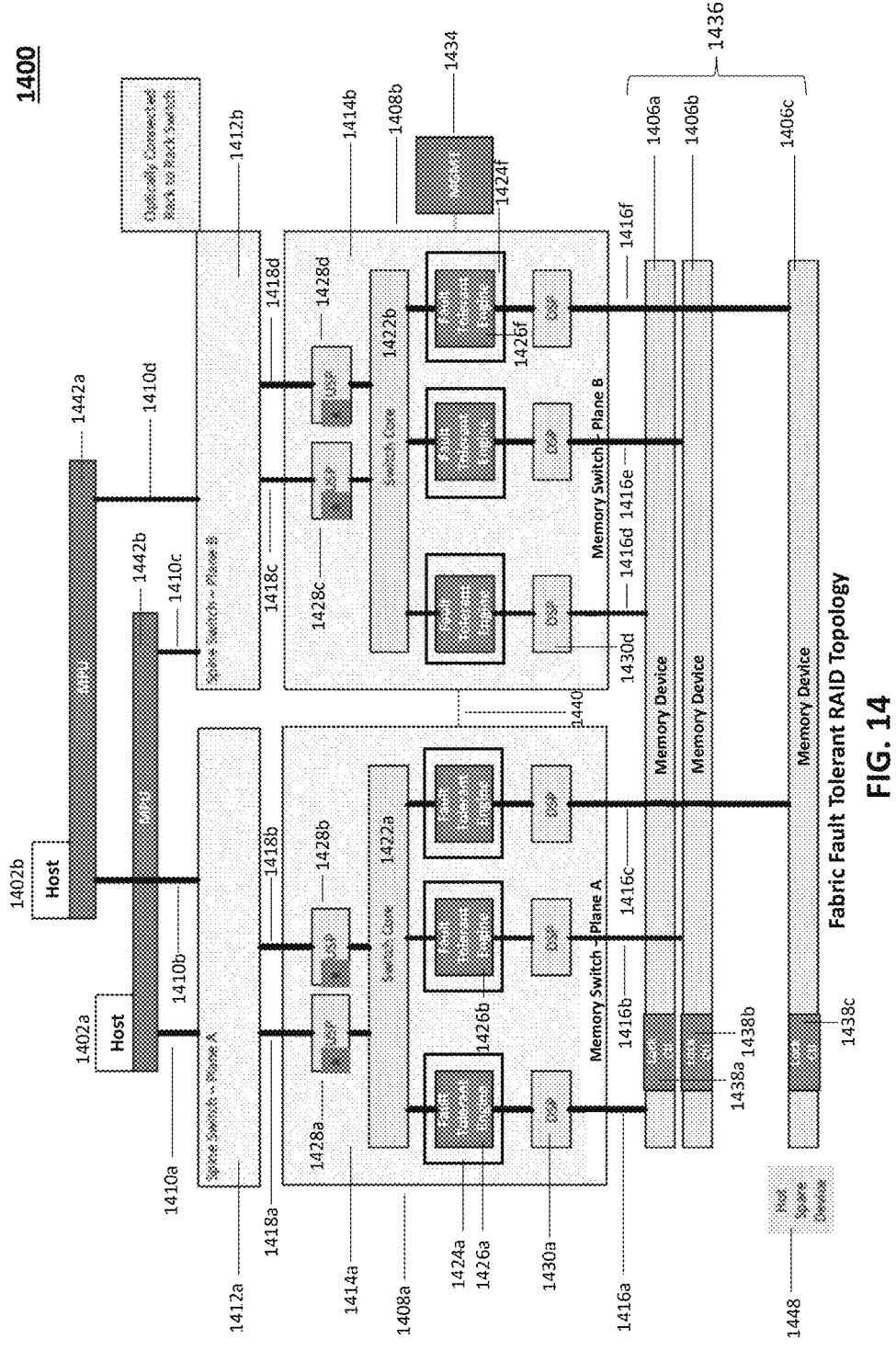
FIG. 14 illustrates a detailed version of a fabric fault tolerant RAID design according to the present disclosure.

In the embodiments, the RAID architecture extends the CXL technology to support better availability. The technology disclosed herein proposes a RAID architecture that supports two major approaches: a basic RAID design (FIGS. 1A-2) and a fabric fault tolerant RAID Design (FIGS. 13-14). Thus, the technology disclosed herein defines two new types of CXL devices: memory devices 106, 206 and fabric fault tolerant memory devices 1306, 1406, as described herein.

Additional types of data devices that may be supported by the basic RAID structure and fabric fault tolerant RAID structure can include GFAM devices. A GFAM device is a highly scalable memory resource that is accessible by all hosts and all peer devices within a CXL fabric. GFAM devices can be assigned exclusively to a single host or can be shared by multiple hosts. The GFAM architecture expands the CXL's memory expansion board by disaggregating memory from a given host and implementing a shared large memory pool. In that respect, a GFAM device is functionally its own shared pool of memory that hosts and devices can reach out to on an as-needed basis. A GFAM device is like a traditional CXL Type-3 device, except it can be accessed by multiple nodes (up to 4095) in flexible ways using port-based routing. The root ports on the fabric 108 may be part of the same or different domains.

With the implementation of CXL 3.0, the present disclosure supports GFAM which allows different types of memory to be directly attached and made accessible to multiple processor nodes. For example, in the present disclosure, a node can be a CPU, a host, a CXL accelerator with or without memory, a PCIe device, or a GFAM device. A GFAM device can contain both volatile and non-volatile memory together, such as dynamic random-access memory (DRAM) and flash memory. Data devices that support sharing, for example, GFAM devices, may support hardware-managed cache coherency across root ports in multiple domains.

In reference to FIG. 1A, in various embodiments, the memory devices 106a, 106b, 106c can be combined into clusters. For example, some memory devices 106a, 106b, 106c, such as CXL memory devices in a cluster, can be organized in parity groups, such as parity group 136.

Figure 3A:
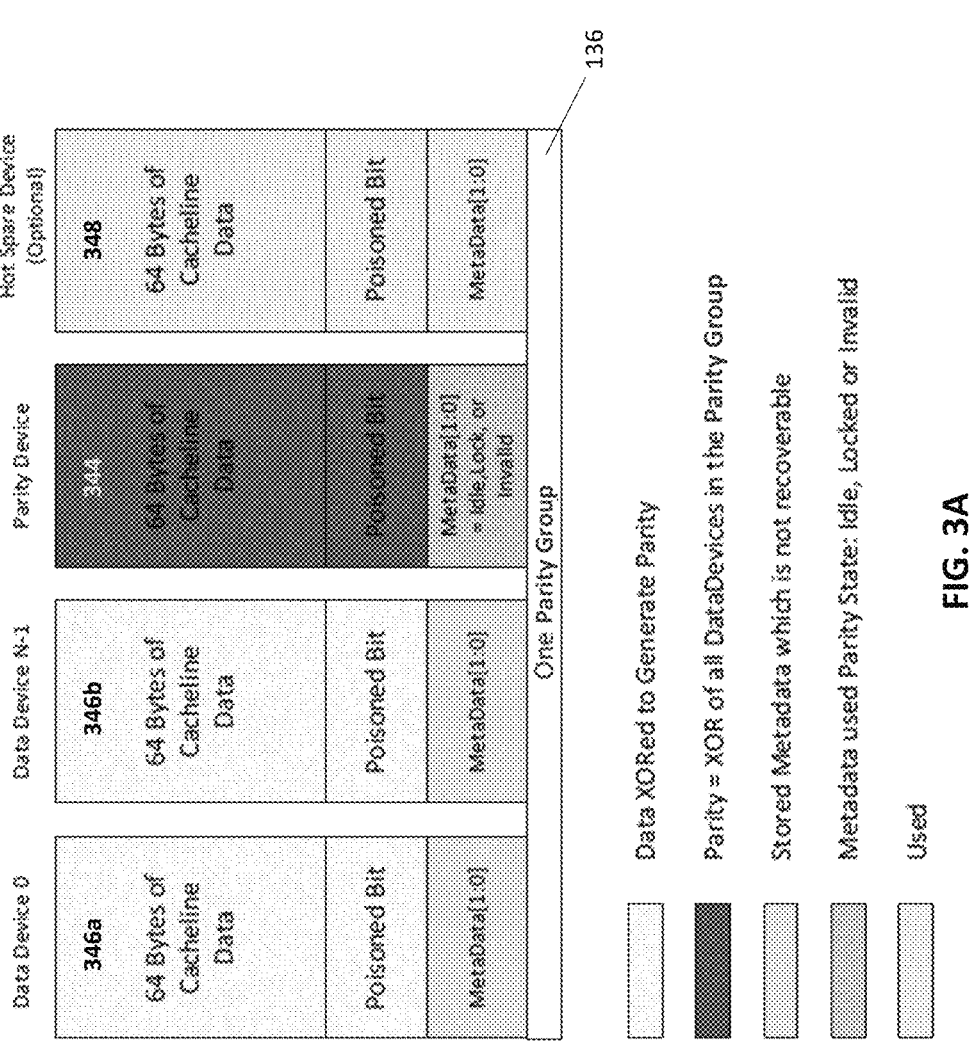
FIG. 3A illustrates an example parity group in accordance with an embodiment.

As shown in FIG. 3A, for a given parity group 136, there can be one parity device 344, some number of data devices 346a, 346b, and one optional "Hot Spare" 348. As used herein, a hot spare is a CXL memory device configured to be dynamically swapped in by the FM to replace the failing device. The parity responsibility can be distributed across all non-spare devices in the group, but for convenience, in some embodiments, the parity device 344 can be designed as the device that takes the parity role for the first cache line in the parity group.

Namely, the CXL device in a cluster can be either part of a parity group 136 or not. If a device is part of a parity group 136, then all bytes associated with that device are assigned to the parity group 136. Because the parity responsibility is interleaved, some of a device's bytes can be used for storing server data and some of a device's bytes can be used for storing parity.

In FIG. 3A, the data and the poison bit indication are XORed together to form a parity. Once the parity is created, the 64 bytes of a cache line data and the poison bit indication can be recovered by XORing the parity and all the other data devices 346a, 346b.

Figure 3B:
FIG. 3B illustrates an example of interleaving for a parity group in accordance with the embodiments.

As illustrated in FIG. 3B, the RAID data interleaving can be performed on a device granularity. All the bytes on a device can be configured such that it is assigned to one parity group with a fixed "N" device or the device is not RAID at all. To further simplify the design, in some embodiments, all the data devices 346a, 346b and the parity device 344 for the parity group 136 may be connected to the same last level switch.

FIG. 3B depicts an example of a simple interleave for RAID with N=4. In FIG. 3B, there are 4 devices and one parity device. The devices take turns being the parity RAID Engine That is, the RAID Interleave Table for a configuration with 1 extra device for every 4 data devices. In the RAID data structure, data is striped across or distributed among all or most of the memory controllers of the devices, with a dedicated parity block for each stripe. In this example, the interleave can be performed on a 256B or larger granulator, so the effectiveness of the memory side cache is not undermined.

In use, the RAID routing block 120 positioned in the switch between the USP 128, and the switch core 122 alters the routing of the data packet, so all requests are sent to the correct fault tolerant engine. The RAID routing block 120 uses the destination port in the CXL request packet, the address in the CXL packet, and CSRs defining the interleave of the devices of the parity group 136 to determine the specific destination fault tolerant engine 126a for the request. This specific destination fault tolerant engine is referred to as the primary fault tolerant engine.

In some embodiments, all the devices in a parity group 136 can be directly connected to the same CXL leaf switch. In the preferred embodiment, the leaf switch 114 can be a RAID capable switch. However, the spine switch 112 and rack-to-rack switches 132 are not required to be RAID capable switches.

The configuration of a parity group 136 can include the following details: the number of data devices 106a, 106b, 106c in the group and whether the group has a hot spare 348. The memory devices 106a, 106b, 106c can be configured by the FM 134 via the set of commands defined in the FM Application Programming Interface (FM API). The memory devices 106a, 106b, 106c can be configured statically or dynamically via the FM 134. The FM 134 can configure the RAID routing block 120a, 120b and the fault tolerant engines 126a, 126b, 126c before the parity group 136 can be used by any host 102a, 102b. To change the RAID configuration, the FM 134 stops all traffic to the memory devices 106a, 106b, 106c.

The FM 134 provides support for the management of the fabric 108. The FM 134 functions as a trusted element of the fabric 108. The FM 134 is responsible for the initialization and setup of the fabric 108 and the assignment of devices to different groups 136. The FM 134 can establish a protection scheme and initialize aspects of the switch so that the host 102a, 102b can gain access through the switch. The FM 134 establishes the protection scheme so that each host 102a, 102b may be permitted to access only a subset of all the memory devices 106a, 106b, 106c. The protection scheme helps to mitigate malicious software attacks. The FM 134 can be implemented as a software.

In embodiments, the FM 134 can add or remove the memory devices 106a, 106b, 106c from the system. In embodiments, the memory devices 106a, 106b, and 106c, which can be added or removed, may be hot spare devices 148, 348 and/or a new data device. The example systems and methods disclosed herein utilize values representative of the status of the memory devices 106a, 106b, 106c measured by the FM 134. This approach facilitates proactive monitoring and/or analysis of the memory devices 106a, 106b, 106c to automatically trigger replacement or maintenance of a data device. In an embodiment, the FM 134 can implement preventative/preemptive maintenance to replace a "ready to be replaced" component. In an embodiment, the FM 134 can swap out a "hot swappable" component if the component can be replaced without bringing down the cluster. The preventative/preemptive maintenance process and the hot-swappable process are described below.

Figure 2:
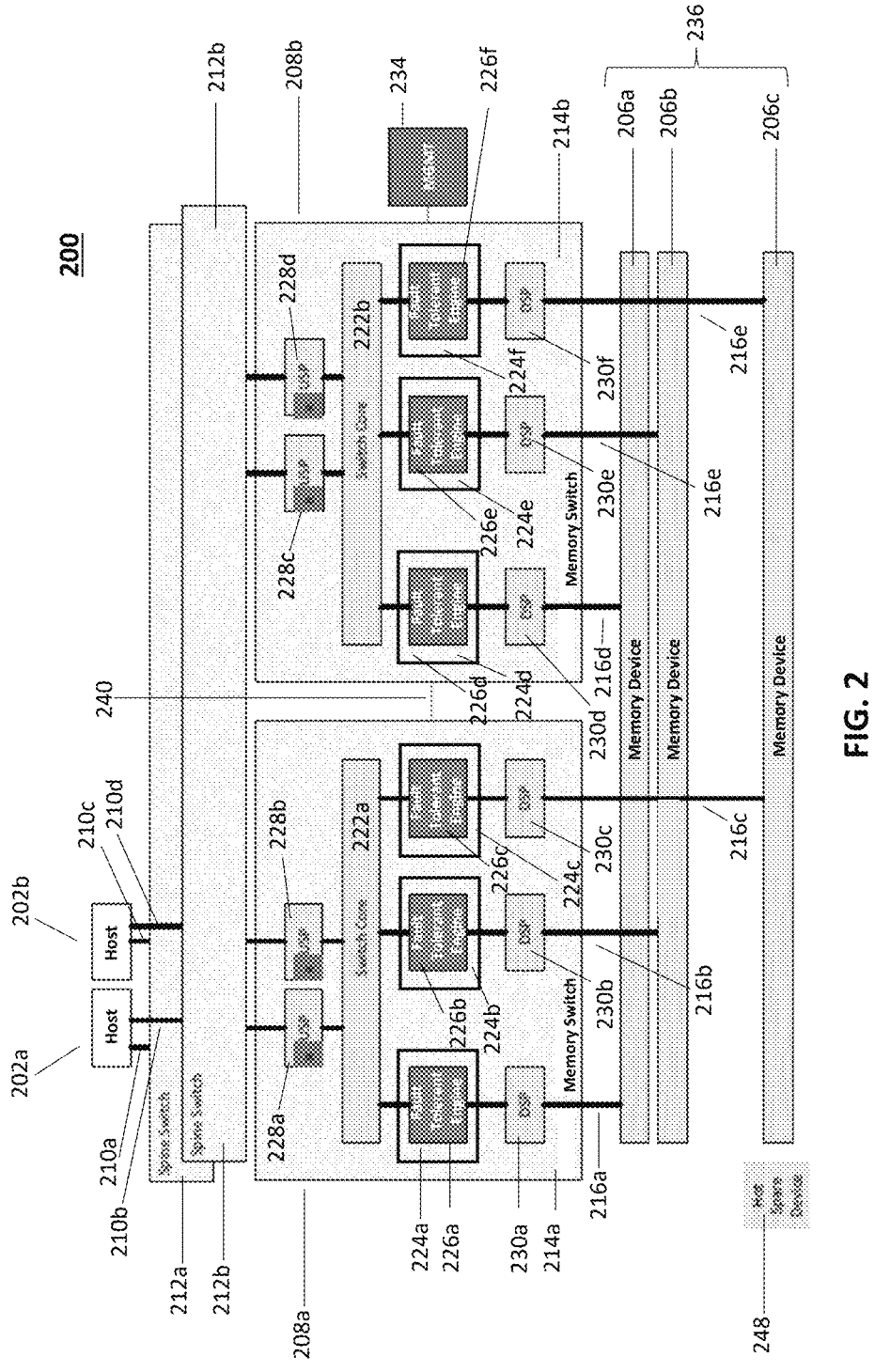
FIG. 2 illustrates an alternate functional block diagram in the form of a cluster topology with a RAID architecture having a redundant switch topology in accordance with the embodiments.

As discussed above, the exemplary embodiment of FIG. 1A relates to a single switch topology. A shortcoming of the single switch topology in FIG. 1A is the loss of connectivity to many memory devices after the occurrence of a switch failure. A solution is to deploy a redundant switch architecture and use multi-ported CXL devices, as shown in FIG. 2. By deploying a redundant switch architecture and using multi-ported CXL devices, access to all CXL devices can be supported if a one switch failure occurs. The architecture of a basic RAID system can support both the single switch topology of FIG. 1A and the redundant switch topology of FIG. 2.

One advantage of the redundant topology in FIG. 2 is that cluster rebooting and reconnecting to all devices can be performed without human intervention when a switch failure occurs. By deploying a redundant switch fabric including at least two switch fabrics as shown in FIG. 2, when one switch fails, it is possible to reboot the server in the cluster by switching to a one switch-plane configuration mode. In the one switch-plane configuration, a faulty switch can be disabled, the hosts can still access the data (and perform a quick consistency algorithm, which is described below).

Thus, the process of reconfiguring the system to a one-switch mode, rebooting all the hosts and switches while preserving the memory power, performing a quick consistency recovery, and starting jobs on the system can all be done without human intervention. Therefore, if the switch failure occurs when human intervention is unavailable, such as during the middle of the night, the cluster can reboot itself.

In comparison to the single switch topology of FIG. 1A, FIG. 2 is an alternative example of a cluster topology with a RAID system 200 configured with a redundant fabric. The cluster topology of the RAID system 200 is similar to the cluster topology of the RAID system 100 in FIG. 1A. For the sake of brevity, only aspects of the RAID system 200 that are different from the RAID system 100 in FIG. 1A will be described below. To the extent illustrated in FIG. 1A, similar components in FIG. 2 are designated by similar reference numerals (e.g., fault tolerant engines 112/212, 126/226). These similar components will not be defined/described/discussed in FIG. 2). This scheme applies to many other components and FIGURES discussed herein.

Referring to FIG. 2, a block diagram of the RAID system 200 including a first fabric switch 208a, a second fabric switch 208b, and a leaf switch connection 240 provided therebetween, is shown. Redundant connections 210a, 210b, 210c, 210d are provided from each host 202a, 202b to each spine switch 212a, 212b. In FIG. 2, the fabric switches 208a, 208b provide a primary access path and a secondary access path that is redundant to the primary access path. The RAID architecture of system 200 can create redundancy in memory so that the failure of a single one of the memory devices 206a, 206b, or 206c or their associated components (like its power delivery system) can be tolerated. In an embodiment, the RAID architecture can be configured to tolerate only one device failure per parity group 236 at a time, but via the online replacement mechanism and prompt servicing of the cluster, this limitation can be overcome.

The RAID system 200 comprises a communications topology through which the memory devices 206a, 206b, 206c are coupled via a plurality of fabric switches 208a, 208b. Although the example in FIG. 2 depicts two fabric switches 208a, 208b, it is to be understood that embodiments of the present disclosure can implement multi-level switching enabled by CXL 3.0, which allows for multiple layers of switches wherein switches feed into other switches. This vastly increases the kinds and complexities of networking topologies supported.

For example, the switch fabric of the system 200 may implement a mesh connection connecting the memory devices 206a, 206b, 206c as endpoints, with the switching mechanisms (fabric switches 208a, 208b) serving as intermediary nodes of the mesh connection. This provides redundancy such that, should a connection between, for example, memory device 206a fail in one fabric switch 208a, the memory device 206a may remain connected via another fabric switch 208b. Moreover, in the event of a failure in a component of a switched fabric, a communications path excluding the failed component and including a functional redundant component may be established.

As described above, the memory devices 206a, 206b, 206c may be a GFAM device. The memory devices 206a, 206*b*, 206*c* are attached to the fabric switches 208*a*, 208*b* and they are accessible and data within the memory devices 206*a*, 206*b*, 206*c* can be shared across the hosts 202*a*, 202*b*. The memory devices 206*a*, 206*b*, 206*c* can connect to the leaf switches 214*a*, 214*b* at the respective DSPs 230*a*, 230*b*, 230*c*, 230*d*, 230*c*, 230*f* via connections 216*a*, 216*b*, 216*c*, 216*d*, 216*e*, 216*f*. A DSP 230 from the first fabric switch 208*a* and a DSP 230 from the second fabric switch 208*b* connect to each memory device 206. For example, DSP 230*a* from the first fabric switch 208*a* and DSP 230*d* from the second fabric switch 208*b* connect to the memory device 206*a*.

In some embodiments, the host device 202*a* and the host device 202*b* may be collectively referred to as host device(s) 202; the memory device 206*a*, the memory device 206*b*, and the memory device 206*c* may be collectively referred to as memory device(s) 206; the DSP 230*a*, the DSP 230*b*, the DSP 230*c*, the DSP 230*d*, the DSP 230*c*, and the DSP 230*f* may be collectively referred to as DSP(s) 230.

Systems employing the RAID architecture depicted in FIGS. 1A-2 can potentially have large pools of memory. These systems can have, for example, thousands of GFAM devices and numerous hosts that can construct very large devices that are many racks in size. In such systems, there are many components. As a result, there is a likelihood that devices may fail before long-running applications can be completed. Instead of restarting the application to eventually complete the application, the system should be configured to tolerate some of these failures and continue operating with the application without having to implement a major restart mode.

Embodiments of the present disclosure are directed toward applying the concept of RAID to GFAM devices to provide a very large-scale solution to device failures. To deal with failures, the concept of RAID may also be applied to GFAM devices to tolerate the failure of a GFAM device so that an administrator of the system can identify there is a problem, potentially take the device offline, replace, repair, or upgrade it. In the meantime, the application does not detect the failure and can continue with its operation.

Figure 4:
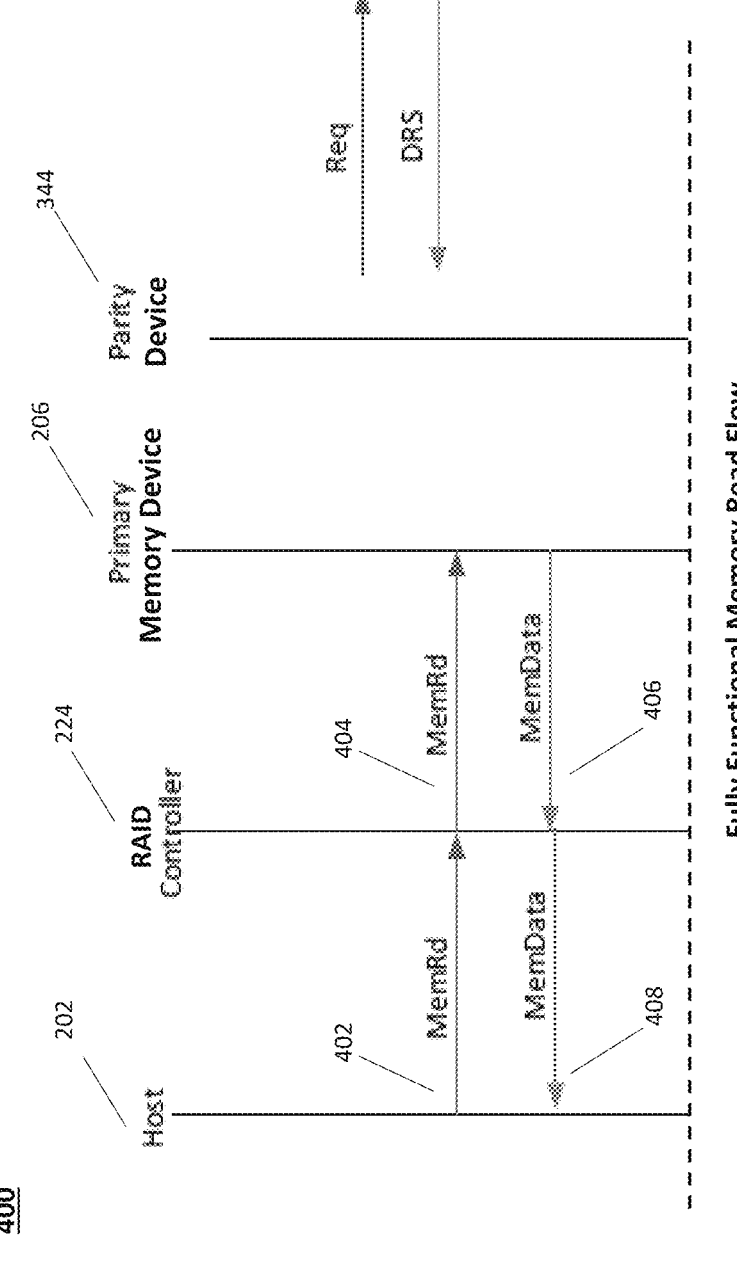
FIG. 4 is a swimlane diagram showing a read operation according to the embodiments.
Figure 5:
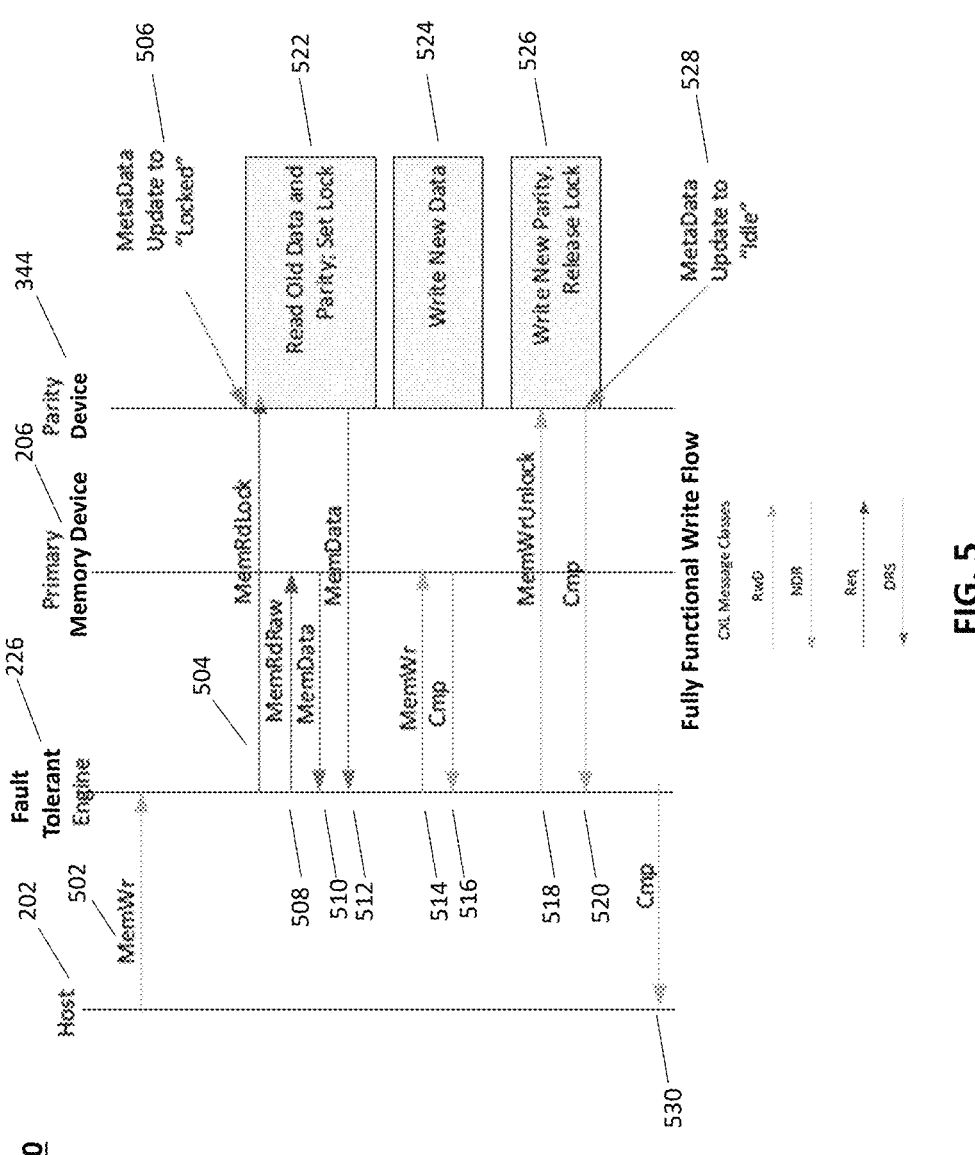
FIG. 5 is a swimlane diagram showing a write operation according to the embodiments.

During the operation of FIG. 1A-2, the RAID controllers 124, 224 or fault tolerant engines 126, 226 can be configured to perform the read operations and the write operations as shown in the swimlane diagrams of FIGS. 4-5. The swimlane diagram shows the relationships between the blocks in the process and the components that are responsible for these blocks.

Fully Functional Read Flow

FIG. 4 is a swimlane diagram showing a process 400 of performing a RAID read operation consistent with the embodiments of FIGS. 1A-2. Although the following examples apply to both the systems 100, 200 of FIGS. 1A-2, for the sake of clarity, the reference numerals of FIGS. 2-3 are used in the examples. FIG. 4 illustrates a read operation approach. In non-failure situations, RAID read operations are straightforward and the process 400 can be performed by host 202*a*, 202*b*, fault tolerant engines 226*a*-226*f*, corresponding RAID controllers 224*a*-224*f*, and memory devices 206*a*, 206*b*.

In some embodiments, RAID controller 224*a*, the RAID controller 224*b*, the RAID controller 224*c*, the RAID controller 224*d*, the RAID controller 224*c*, and the RAID controller 224*f* may be collectively referred to as RAID controller(s) 224; the fault tolerant engine 226*a*, the fault tolerant engine 226*b*, the fault tolerant engine 226*c*, the fault tolerant engine 226*d*, the fault tolerant engine 226*e*, and the fault tolerant engine 226*f* may be collectively referred to as fault tolerant engine(s) 226.

There are two message classes: a read Request (Req) and a Data Responses (DRS) message. The response message may be generated based on an S2M DRS message of the CXL protocol. In the exemplary process 400 of a non-failure situation of a fully functional read flow, the memory read requests are serviced by a primary RAID controller 224 and a primary memory device 206. The host 202 sends a read data request using MemRd (operation 402) to one of the fault tolerant engines 226*a*-226*f* of a corresponding one of the RAID controllers 224*a*-224*f*, which sends the read data request using MemRd (operation 404) to the primary memory device 206. The primary memory device 206 responds with the requested data using a MemData response (operation 406) to the one RAID controller 224 which sends the requested data using a MemData response (operation 408) to the host 202.

Fully Functional Write Flow

FIG. 5 is a swimlane diagram showing an exemplary process 500 of performing a RAID write operation consistent with the systems 100, 200 of FIGS. 1A-2. Although the following examples apply to both the systems 100, 200 of FIGS. 1A-2, for the sake of clarity, the reference numerals of FIGS. 2-3 are used in the examples. FIG. 5 illustrates a write operation approach. In a fully functional write flow, RAID write operations are more complicated than the RAID read operation described above in FIG. 4. In some cases, this increased complexity may impact overall latency and throughput. The process 500 can be performed by the host 202, the fault tolerant engine 226 of the RAID controller 224, the primary memory device 206 and a parity device 344 (FIG. 3A).

Here, there are four message classes: a write Request (RwD), a No Data Response (NDR), an Req, and a DRS message. In the exemplary process 500 of a fully functional write flow, the host 202 initiates a write request using MemWr (operation 502) to the primary fault tolerant engine 226 of one of the RAID controllers 224.

In FIG. 5, according to some embodiments, in operation 504, when the primary fault tolerant engine 226 requests to read data from the parity device 344 and to lock the parity cache line (a 64 byte line in the parity device 344) using MemRdLock, the parity device 344 updates the status of the metadata bit of the parity device 344 to locked (506). As noted above, only parity groups get locked. A parity group is N data cache lines and one parity cache line. In operation 522, the old data and the parity data are read and the lock is set. The parity device 344 transmits, as a response (operation 512), the requested data (old data and parity data) together with the locked state of the parity group to the primary fault tolerant engine 226.

By locking the parity cache line, the fault tolerant engine 226 performs an atomic operation wherein the fault tolerant engine 226 locks the cache line, performs an operation on the data, and then unlocks the data. In general, atomic means "one at a time." In computer programming, an operation is considered atomic if it is guaranteed to be isolated from other operations that may be happening at the same time. For example, it means that only one read or write operation can be performed at a time. If a program reads a property atomically, this means that the property cannot change during this read operation. Where data is being used by an atomic operation, it can be implemented in either sequential processing environments or locking mechanisms have to be used to avoid data errors.

In FIG. 5, the fault tolerant engine 226 can implement a read-modify-write to the cache line of the parity device 344, and because of the lock, the system prevents all other threads of execution on that same host or different hosts from accessing the parity group and modifying it during the time that one of the processors is performing a read-modify-write. According to the present disclosure, this is an example of the atomic aspect where the system modifies the memory in an atomic manner to obtain a consistent result. The system performs a read, modify, and write, while no other reads or writes are performed therein between. During the atomic memory operation, a processor can read a location, modify it, and write it back in a single operation. The read-modify-write is an atomic memory operation that both reads a memory location and writes a new value into it as part of the same operation.

Referring to FIG. 5, in operation 508, the primary fault tolerant engine 226 reads the target primary memory device 206 using MemRdRaw. The target device is the location where the data is to be written.

In operation 510, the target primary memory device 206 responds with the requested data using a MemData response to the fault tolerant engine 226.

In operation 512, the old data and the parity data are sent from the parity device 344 to the primary fault tolerant engine 226 using MemData.

In operation 514, when the fault tolerant engine 226 requests to write data using MemWr to the target primary memory device line 206, the data requested to be written to the target primary memory device line 206 is written (operation 524), and the target primary memory device line 206 transmits a response (Cmp) in operation 516 informing the fault tolerant engine 226 that the writing has been completed, in operation 520. In general, Cmp indicates that writing, reading, or invalidation has been completed.

The primary fault tolerant engine 226 can then generate new parity checksum data based on the existing parity data, the existing data, and the new data. In one example, generating the new parity data can involve read-modify-write operations and XOR operations. The read-modify-write operations can use the existing data and the existing parity checksum data accessed from the parity device 344 before it is overwritten and the XOR operations can use the existing parity checksum data, the existing data, and the new data to generate the new parity checksum data.

In operation 518, the fault tolerant engine 226 requests to write the new parity checksum data and unlock the cash line using MemWrUnlock to the parity device 344. The data requested to be written to the parity device 344 is written and the cache line lock is released (operation 528) which unlocks the entire parity group so that another operation can be performed and the metadata is updated to idle status (operation 526).

In operation 520, the parity device cache line 344 transmits a response (Cmp) informing the fault tolerant engine 226 that the writing and unlocking have been completed.

Then, in operation 530, the fault tolerant engine 226 sends a response (Cmp) informing the host 202 that the writing has been completed.

Figure 6:
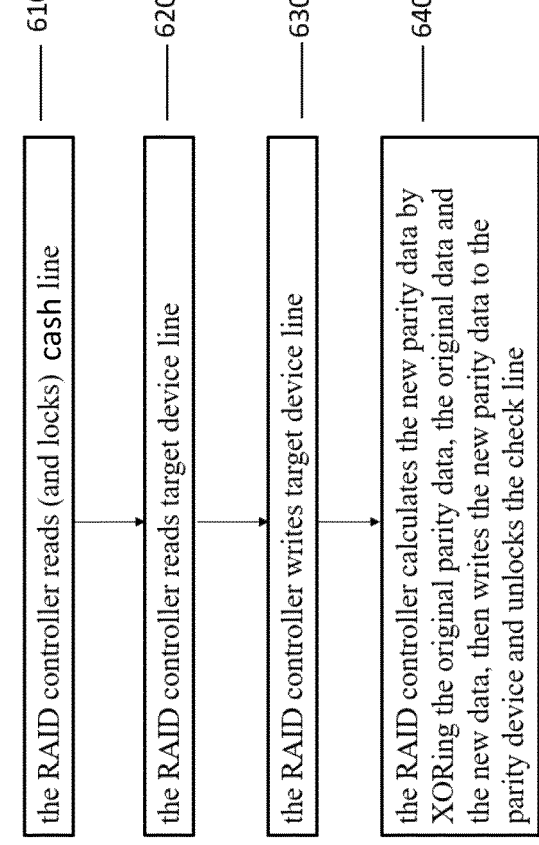
FIG. 6 illustrates a flow chart of an example method of operating a write operation according to the embodiments.

In the flow chart of FIG. 6, a process 600 summarizes the write operation process 500 in FIG. 5. In summary, during the write operation, an atomic operation is performed wherein the primary device data and the parity data are both updated atomically to prohibit other requests from gaining access to the cache line during the transaction. Once the primary device data and the parity data are both updated atomically, this results in the memory being in a consistent state again and the lock on the cache line can be released to permit other read or write operations to be processed.

As illustrated in the flow chart of FIG. 6, one approach to implementing a parity group write sequence includes the following blocks: in block 610, the fault tolerant engine reads and locks the parity device cache line; in block 620, the fault tolerant engine reads the target device line; in block 630, the fault tolerant engine writes to the target device line; and in block 640, the fault tolerant engine calculates the new parity data by XORing the original parity data, the original data and the new data, then writes the new parity data to the parity device cache line and unlocks the parity device cache line.

If the parity device cache line is already locked, then any new subsequent requests for a write or read that are received must either wait until an unlock or a timeout occurs. In such a situation, one or more fault tolerant engines are attempting to simultaneously access the parity device cache line. The subsequent requesting fault tolerant engine must either wait until the previous operation is complete and the lock clears or retry the access attempt.

Referring back to FIG. 3A, to implement the already locked feature, according to the present disclosure, two bits of meta states for the devices (e.g., GFAM device meta state) are added per parity groups 136, 236, 1436. The two bits of meta states are: (1) cache line is locked, which is required for cache lines and (2) cache line is invalid, which is required for all cache lines. These two bits are included in the parity device 344. The lock bit is an extra bit of state. Therefore, it is referred to as meta state because it's not included in the 64 bytes of data, but in addition to that data. In some embodiments, the system can be enhanced to support a 256 bytes approach.

A RAID locked meta state, in some embodiments, can be used only on parity device cache lines, set when the parity device cache line is read, and cleared when the parity device cache line is written. In practicality, all the devices of a parity group can be configured to include the two bits of meta state. However, the parity device can be configured to be the only device that uses them. If the lock times out or the GFAM device is powered down with the lock state set, then the lock state is cleared and the RAID invalid meta state is set.

A parity device cache line that times out maintains a state indicating the parity device cache line is invalid. In some embodiments, if the memory devices 106, 206, 1306, 1406 are persistent media that maintains its stored value or data bits while in an unpowered state (e.g., NOT-And (NAND) devices), then the invalid state must also be persistent. The lock bit is not required to be persistent. If a timeout occurs while the cache line is locked (FIGS. 5, 7, 12), the lock bit is cleared and the invalid bit is set.

Thus, the existing values are retained until the next operation and, in response, the invalid message is returned to the RAID controller 124, 224, 1424. The invalid message informs the RAID controller 124, 224, 1424 that the previous operation did not successfully complete and to assume that the value is "invalid." This indicates that a regeneration or rebuild of the parity group 136, 236, 1436 is required. Thus, a read to an invalid parity device cache line returns an invalid state to the RAID controller 124, 224, 1424 indicating regeneration is required.

The RAID invalid meta state is set if the lock times out or the GFAM device is powered down when the lock state is set. The RAID invalid meta state is cleared when the parity device cache line is written.

If a request is blocked because the parity device cache line is locked, the subsequent requesting fault tolerant engine 126, 226, 1426 must either wait until the previous operation is complete and the lock clears or retry the access attempt. The blocked requests can be queued at the GFAM device or retried via the locked response sent back to RAID controller 124, 224, 1424. The RAID controller 124, 224, 1424 can store the request in a queue of pending operations until the lock completes. This means the host 102, 202, 1402 sends the request once to the RAID controller 124, 224, 1424 and the RAID controller 124, 224, 1424 waits until it can perform the operation.

An alternative to waiting until the lock completes is to retry the operation. A response is sent back to the RAID controller 124, 224, 1424 indicating the lock state and to retry the request.

Since the write operations can be more complicated than the read operations, one assumption, according to the present teaching, is that the RAID controller 124, 224, 1424 is located at the leaf switch. However, it is within the scope of the present teachings that the RAID controller 124, 224, 1424 may be included at other locations and/or other components of the switch. For example, the fault tolerant engine can be positioned as a single component between the USP 128, 228a/228b/228c/228d, 1428a/1428b/1428c/1428d and the switch core 122, 222a/222b, 1422a/1422b, or the fault tolerant engine can be included within one or more of the USPs 128, 228a/228b/228c/228d, 1428a/1428b/1428c/1428d.

Conflict Resolution

Figure 7A:
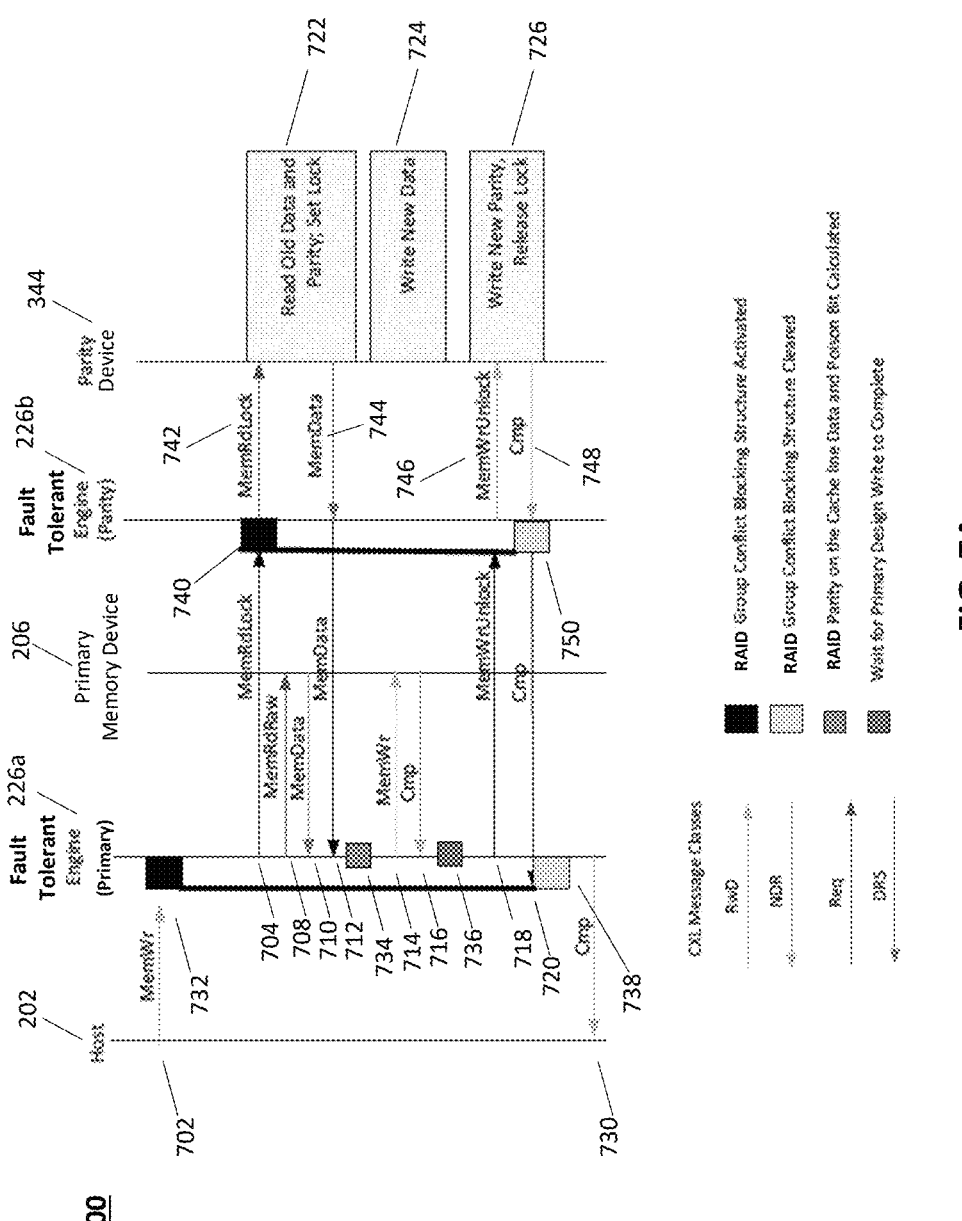
FIG. 7A is a swimlane diagram showing a conflict resolution operation according to an exemplary embodiment of the present disclosure.

FIG. 7A demonstrates an example process 700 of conflict resolution for applications, such as RAID, implemented according to an embodiment of the present teachings. In general, with traditional RAID applications, one of the most difficult technical problems is maintaining a consistent state for the data and the parity in a parity group, because conflicts can occur when multiple requests want access to update the same cache line at the same time. In a distributed fabric containing multiple fault tolerant engines, a loss of access to data may result from other fault tolerant engines waiting forever for a failed fault tolerant engine to release its lock. Data corruption may result from inconsistent data and parity values due to interrupted locked RAID sequences in the event of a failed fault tolerant engine. Corruption occurs if the inconsistent parity is relied upon to reconstruct any of the data cache lines.

To maintain consistency, the fault tolerant engines work together to ensure that only one parity group is being updated at a time. One challenge is to perform this conflict resolution for extremely high request rates of the memory systems. In one example, in an extreme case, every fault tolerant engine may receive a new write request every clock. For performance reasons, in such a case, the write processing rate preferably needs to be set close to processing one cache-line write per two clocks.

FIG. 7A shows an example of conflict resolution for the fully functional write applications in FIG. 5 when multiple write requests want access to update the same cache line. FIG. 7A shows a write operation with conflict check blocking and the sync points that the fault tolerant engine implements. Therefore, in the process 700, the multiple request conflicts are resolved using a conflict resolution performed at a primary fault tolerant engine (226a) and a parity fault tolerant engine (226b). In essence, a read-modify-write operation is performed on the parity data for every write operation.

In operation 702, all write requests are routed using MemWr to the primary fault tolerant engine 226a which functions as the master for the coordination of writes (and reads). The primary fault tolerant engine 226a performs conflict resolution with other requests to the same home agent.

If there is a conflict at the primary fault tolerant engine 226a, in operation 732, the parity group conflict blocking structure is activated and a subsequent conflicting request is blocked and held in a conflict list queue and processed after the request received first finishes.

In operation 704, to process the request received first, the primary fault tolerant engine 226a requests to read data from the primary fault tolerant engine 226b and to lock the parity device cache line using MemRdLock.

In operation 722, the old data and the parity data are read out of the parity fault tolerant engine parity 226b and the lock is set. In operation 708, the primary fault tolerant engine 226a reads the primary memory device line 206 using MemRdRaw. In operation 710, the primary memory device 206 responds with the requested data using a MemData response to the primary fault tolerant engine 226a.

In operation 712, the parity fault tolerant engine 226b transmits, as a response, the requested data (the old data and the parity data) together with the locked state to the primary fault tolerant engine 226a. In operation 734, the RAID parity on the parity device cache line and the poison bit are calculated.

In operation 714, when the primary fault tolerant engine 226a requests to write data using MemWr to the target primary memory device line 206, the data requested to be written to the target primary memory device line 206 is written in operation 724, and the target primary memory device line 206 transmits a response (Cmp) in operation 716 informing the primary fault tolerant engine 226a that the writing has been completed.

In operation 736, the primary fault tolerant engine 226a waits for the primary memory device 206 to complete the write.

In operation 718, the primary fault tolerant engine 226a requests to write the new parity checksum data and unlock the cash line using MemWrUnlock to the parity fault tolerant engine 226b. The data requested to be written to the parity fault tolerant engine 226b is written and the cache line lock is released, in operation 726, which unlocks the entire parity group.

In operation 720, the parity fault tolerant engine 226b transmits a response (Cmp) informing the primary fault tolerant engine 226a that the writing and unlocking have been completed. In operation 738, the parity group conflict blocking structure is cleared.

Returning to operation 702, if no conflict exists at the primary fault tolerant engine 226a, when the write request is sent to the primary fault tolerant engine 226a, then in operation 704, the primary fault tolerant engine 226a allocates an active modification entry, and, using MemRdLock, forwards a lock request to the parity fault tolerant engine 226b. The parity fault tolerant engine 226b performs a further conflict detection to ensure that only one request is modifying the parity data associated with the parity group, at a time.

If there is a conflict at the parity fault tolerant engine 226b, in operation 740, the parity group conflict blocking structure is activated and the subsequent lock request is blocked and held in a conflict list queue and processed after the lock request received first finishes.

In operation 742 to process the lock request received first, the parity fault tolerant engine 226*b* requests to read data from the parity device 344 and to lock the parity cache line using MemRdLock.

In operation 744, the parity device 344 responds with the requested data using a MemData response to the parity fault tolerant engine 226*b*.

In operation 746, the parity fault tolerant engine 226*b* requests to write the new parity checksum data and unlock the parity cache line using MemWrUnlock to the parity device344. The data requested to be written to the parity device 344 is written and the parity cache line lock is released, in operation 726, which unlocks the entire parity group.

In operation 748, the parity device 344 transmits a response (Cmp) informing the parity fault tolerant engine 226*b* that the writing and unlocking have been completed. In operation 750, the conflict blocking structure is cleared. In operation 730, the fault tolerant engine 226*a* sends a response (Cmp) informing the host 202 that the writing has been completed.

The conflict queue size should be designed to be large enough so there is always sufficient space for storage of the conflicting requests. In an embodiment, the conflict queue size can be managed and controlled by an architectural bound on the number of memory devices in a parity group, and each host can have only one outstanding pending write request per address.

Quick Consistency Recovery Technique

In some embodiments of the RAID architecture, the system and method may employ a quick consistency recovery algorithm. FIG. 7B illustrates Table 1 showing a quick consistency recovery algorithm; whereas FIG. 7A illustrates the process of maintaining consistency. When a switch fails in the middle of a RAID group update, the parity device may become inconsistent with the memory devices leaving the memory in a state susceptible to data corruption.

FIG. 7A includes two control structures: the primary fault tolerant engine 226*a* and the parity fault tolerant engine 226*b*. The primary fault tolerant engine 226*a* is associated with the connection 216*a* directly connected to the memory device 206*a* holding the data for the location being accessed. The parity fault tolerant engine 226*b* is associated with the connection 216*b* connected to the memory device 206*b* holding the parity for the parity group 236.

The RAID architecture, in some embodiments, requires that the parity lock metadata bit be set in the media when the parity lock is acquired after a switch failure occurs. Then, the fabric management software may scan all RAID memory and "fix" any inconsistent RAID groups. This feature has significant availability advantages for GFAM devices built with persistent media or clusters built with always powered-on memory devices and are accessible even after a switch failure occurs. Employing the quick consistency recovery technique is advantageous because the time required to rebuild a large GFAM installed from storage can be significant.

As shown in Table 1 of FIG. 7B, the quick consistent recovery scheme can scan all RAID memory performing the algorithm outlined in Table 1. In addition, as shown in FIG. 3A, the metadata in the RAID group can be used to define a lock state. In Table 1, if the lock bit state in the media is set, the quick consistency recovery algorithm can determine whether the data and parity are consistent by checking whether the parity device data equals the XORing of the data of all the other memory devices. If the parity device data equals the XORing the data of all the other memory devices, the action taken is to clear the lock and rewrite the parity data. If the parity device data does not equal the XORing the data of all the other memory devices, the action taken is to clear the lock and write the parity data generated from XORing the data.

Read Access Scenarios

Figure 8:
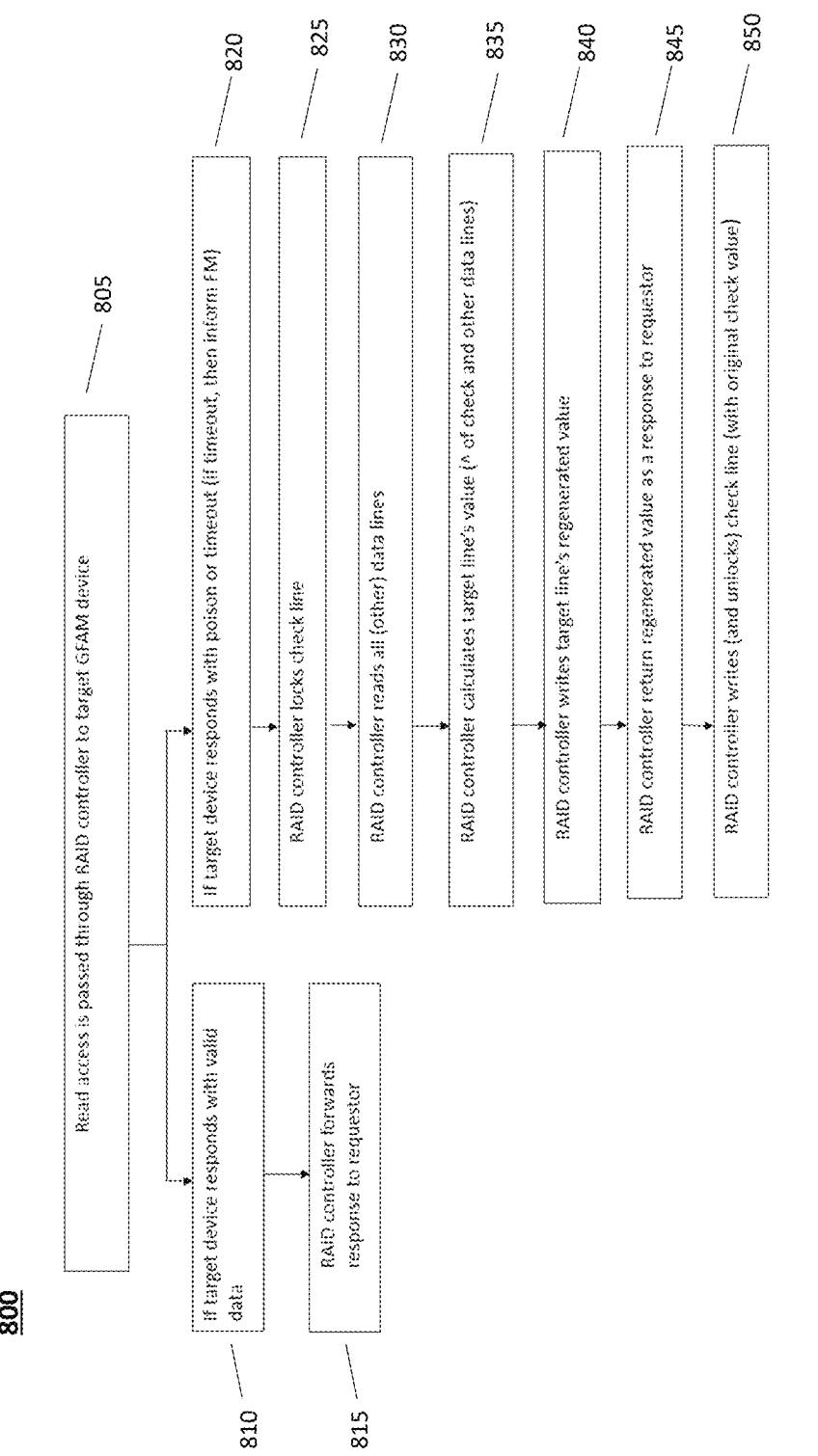
FIG. 8 illustrates a flow chart of an example method of operating a read access operation according to an exemplary embodiment of the present disclosure.
Figure 9A:
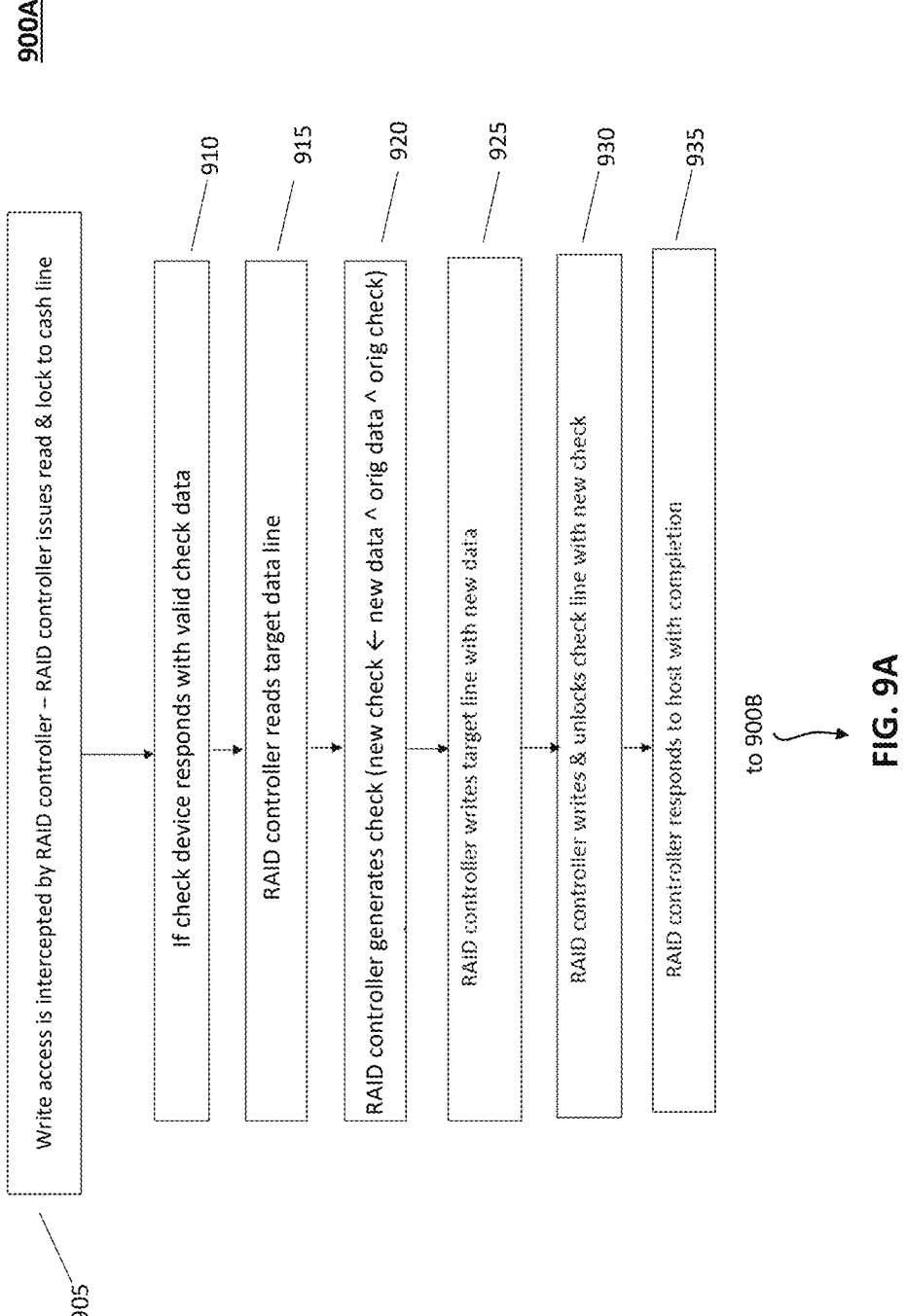
FIG. 9A-9B illustrate a flow chart of an example method of operating a write access operation according to an exemplary embodiment of the present disclosure.
Figure 9B:
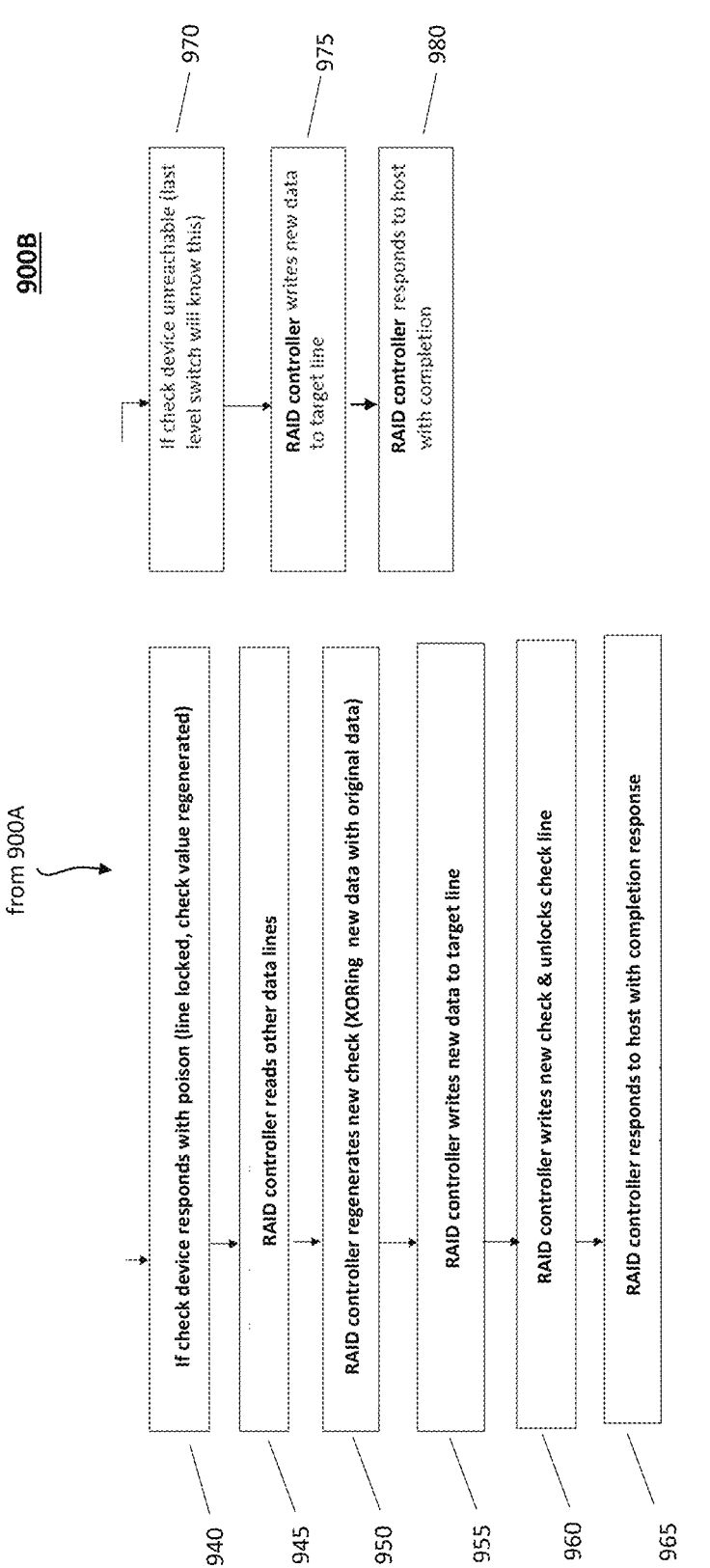

Access of data may include a read access scenario and a write access scenario. The method of operation may be different for a read access scenario and a write access scenario. FIG. 8 shows an example flowchart 800 for a read access scenario. FIGS. 9A-9B show example flowcharts 900A and 900B for a write access scenario.

In the flowchart 800 of FIG. 8, in block 805, a read access is passed through a RAID controller. If the target device responds with valid data in operation 810, the response is forwarded to the requestor in block 815. This is a straightforward solution that provides very high throughput.

In block 820, if the target device responds with poison or timeout (if a timeout occurs, then inform the FM), a poison bit indicates bad data and that valid data is not recoverable. This means that the target device line needs to be rebuilt using the data of the other devices in the parity group to obtain valid data which can then be sent to the host. To recover the valid data, an XOR operation is performed on all devices of the parity group excluding the target device. For example, in a 4+1 parity group, when the target device returns the poison response, the RAID controller XORs the other three devices plus the parity device. Therefore, the XOR operation uses the data from all four devices to reconstruct the valid data and then send the valid data back to the host.

To begin recovery of the valid data, in block 825, the RAID controller locks the parity cache line. In block 830, the RAID controller reads all the other data lines in the parity group. In block 835, the RAID controller calculates the target line's value by XORing the check data and the data lines of the other devices (64 bytes). In block 840, the RAID controller writes the target line's regenerated value. In block 845, the RAID controller returns the regenerated value as a response to the requestor. In block 850, the RAID controller writes (and unlocks) the parity cache line (with original check value).

In a read access scenario, if an MPU (described below) is present and a poison response or a timeout occurs, the MPU issues the request on an alternate fabric to try to access the line. The request may be successfully transmitted to the target device and the data is sent back to the requestor. However, the RAID controller on the alternate fabric may receive a poison response (i.e., from the previous lock timed out). If the RAID controller on the alternate fabric also receives a poison response, then this situation is handled by recovering the valid data, as described above in blocks 820-850. The MPU enables the system to handle switches that are bad and to send the request in an alternate path.

Write Access Scenarios

In the exemplary flowcharts 900A and 900B for a write access scenario in FIGS. 9A-9B, a write access is intercepted by a RAID controller and the RAID controller issues read and lock to a parity cache line in block 905 of the flowchart 900A. In block 910, if the check device responds with valid check data, the RAID controller reads the target data line in block 915. In block 920, the RAID controller generates new check data by performing an XOR operation on the new data, original data, and original check data. In block 925, the fault tolerant engine writes the target line with new data. In block 930, the RAID controller writes and unlocks the parity cache line with the new check data. In block 935, the RAID controller responds to the host with the completion response.

In block 940 of flowchart 900B, shown in FIG. 9B, if the check device responds with poison, the RAID controller locks the parity cache line. The RAID controller receives an invalid response; therefore, the check value has to be regenerated. In block 945, the RAID controller reads the other data lines. In block 950, the RAID controller regenerates the new check by XORing the new data with the original data of the other lines. In block 955, the RAID controller writes the new data to the target line. In block 960, the RAID controller writes the new check and unlocks the parity cache line. In block 965, the RAID controller responds to the host with a completion response.

In block 970, if the check device is unreachable, the information regarding the status of the check device may be obtained from the last level switch which is in communication with the check device. The check device may be unreachable because the link to the check device is down. In block 975, the RAID controller writes the new data to the target line. In block 980, the RAID controller responds to the host with the completion response.

In various embodiments, an alternate path for verification is provided when a device is unreachable. The system can perform an automatic failover. During the automatic failover, requests which would otherwise be processed through the first path will be routed to an alternate path of an alternate fabric. In embodiments, active-active redundant switch fabrics can provide access simultaneously down multiple paths, such as the two paths shown in FIG. 2 and FIGS. 13-14, to the memory devices. If a response indicates that a device is unreachable and the device appears to be down at a first port on a first path, a leaf switch connection can be used to switch to an alternate path and direct transmission through the second port to verify that the device is down.

As an example of using an alternate path for verification, in FIG. 2 and FIGS. 13-14, a leaf switch connection 240, 1340, 1440 can provide an alternate path that links a first fabric switch 208*a*, 1408*a* and a second fabric switch 208*b*, 1408*b* to a memory device 206, 1306, 1406. Two ports are provided for each device. A DSP 230, 1430 from the first fabric switch 208*a*, 1308*a*, 1408*a* and a DSP 230 from the second fabric switch 208*b*, 1308*b*, 1408*b* respectively connect to the devices 206, 1306, 1406.

For example, DSP 230*a*, 1330*a*, 1430*a* from the first fabric switch 208*a*, 1330*a*, 1430*a* and DSP 230*d*, 1330*d*, 1430*d* from the second fabric switch 208*b*, 1308*b*, 1408*b* connect to device 206*a*, 1306*a*, 1406*a*. If response to a request sent along a first path through fabric switch 208*a*, 1308*a*, 1408*a* indicates that memory device 206, 1306, 1406 is unreachable, the leaf switch connection 240, 1340, 1440 can be used to switch to a second path through fabric switch 208*b*, 1308*b*, 1408*b* to transmit the request to confirm whether the memory device 206, 1306, 1406 is actually down or remains operable. If the memory device 206, 1306, 1406 is operable, it processes the request.

Various embodiments can perform an atomic operation with mask writes. In some embodiments, the fault tolerant engine may perform atomic operations and masked writes (using the CXL.mem or CXL.UIO protocol) to generate a new check data. The masked write operation masks data to suppress and/or prevent the data in a write operation from being written to some of memory cell blocks that constitute a memory cell array. By performing the masked write operation, some of the memory cell blocks, to which data is not written, retain previous data, and new data is written to the remaining memory cell blocks.

The embodiments can perform a wide range of atomic operations because a lock is already obtained to perform the RAID operation. Example atomic operations that can be implemented according to the present teachings include fetch-and-increment, fetch-and-decrement, fetch-and-add, fetch-and-subtract, fetch-and-AND, fetch-and-OR, fetch-and-XOR, fetch-and-minimum, fetch-and-maximum, fetch-and-swap, and compare-and-swap. For example, an atomic fetch-and-increment operation atomically increments the contents of a memory location by a specified value. The fetch-and-increment atomically increments a value in the memory. The fetch-and-increment implements the lock with an increment +1. In this embodiment, the mask write instructions can specify the data of the memory which data is written and which data is not written.

An atomic operation that permits the locking of data to perform read-modify-write operations can be combined with a masked write operation to generate the new check data, as previously described in relation to FIG. 9A. With the exception of block 920, the same sequences of operations are performed as described with regards to blocks 910-935 in FIG. 9A. First, the RAID controller sets the lock and reads the target data line. However, instead of performing an XOR operation to generate the new check data (block 920), the RAID controller implements an atomic fetch and increment operation with a masked write.

When performing a mask write, the CXL.mem protocol can only write a subset of the bytes of the 64 bytes. The masked write operation is a partial cache line write operation that prevents a portion of the existing data from being overwritten by the new data to retain some of the existing data when the new data is written to a target device. For example, during the write operation, the RAID controller may write to a subset (e.g., 8 bytes) of the 64 bytes, instead of writing to all 64 bytes. Thus, there are 8-byte values in the memory. The fetch and increment operation increments the original data at a memory location by a specified value (e.g., the increment value +1).

In this example, the RAID controller uses the appropriate 8 bytes of the original data and increments it by the increment value of 1. Thus, the RAID controller calculates the new data based on the original data. Then, the RAID controller writes into the target data the new data based on the masked value and the other portion that is not written to retain the previous data. In essence, the embodiments work extremely well with performing a wide range of atomic operations, because a lock is already obtained to perform the RAID operation.

For example, a traditional atomic fetch-and-increment implements a mutual exclusion lock with an increment value of 1 wherein the entire function is executed atomically so that no other processes can interrupt the function. According to the present disclosure, the RAID operation and the atomic operations can be performed simultaneously with the same lock. In some embodiments, a batch of atomic operations can be performed efficiently on a per clock basis at the RAID controller.

Rebuild Operations

In embodiments, the system 100, 200, 1400 can perform a data rebuild operation responsive to detecting a failure of a device included in a parity group. In some implementations as shown in FIGS. 1, 2, and 14, the RAID controller 124, 224, 1424 may use one or more hot spare devices 148, 248, 348, 1448 to provide additional data protection to the parity group 136, 236, 1436. In an instance where a device that is part of a parity group fails, a hot spare device 148, 248, 348, 1448 may be used to replace the failed device. The hot spare device 148, 248, 348, 1448 is not used during normal access operations, but rather sits in reserve to replace any device 106 that has failed.

The hot spare device 148, 248, 348, 1448 does not contain any data until a failure occurs and the hot spare device is needed. The hot spare replacement allows the RAID controller 124, 224, 1424 to perform reconstruction. Reconstruction is a background process executed in the RAID system to regenerate the data from the failed device. In such an instance, the data of the failed device may be rebuilt in the hot spare device 148, 248, 348, 1448 using data from the other devices that are part of the parity group. In this manner, the parity group 136, 236, 1436 may be returned to its redundant state, and the hot spare device 148, 248, 348, 1448 becomes part of the parity group.

More specifically with regard to operation of system 100, 200, 1400 and more particularly operation of RAID controller 124, 224, 1424, responsive to sensing the failure of a group 136, 236, 1436, the RAID controller 124, 224, 1424 writes an invalid value to every line of the hot spare device 148, 248, 348, 1448 before swapping in the hot spare device 148, 248, 348, 1448 to replace the failed device. The invalid message indicates that a regeneration or rebuild of the parity group 136, 236, 1436 is required, as described above with reference to FIGS. 8 and 9B.

After a failure occurs, a rebuild operation is performed wherein the invalid value is written to the lines of the hot spare device 148, 248, 348, 1448 before the hot spare device is swapped in to replace the failed device. Then, the data of the failed device may be rebuilt in the hot spare device 148, 248, 348, 1448 using data from the other devices that are part of the parity group.

Figure 11:
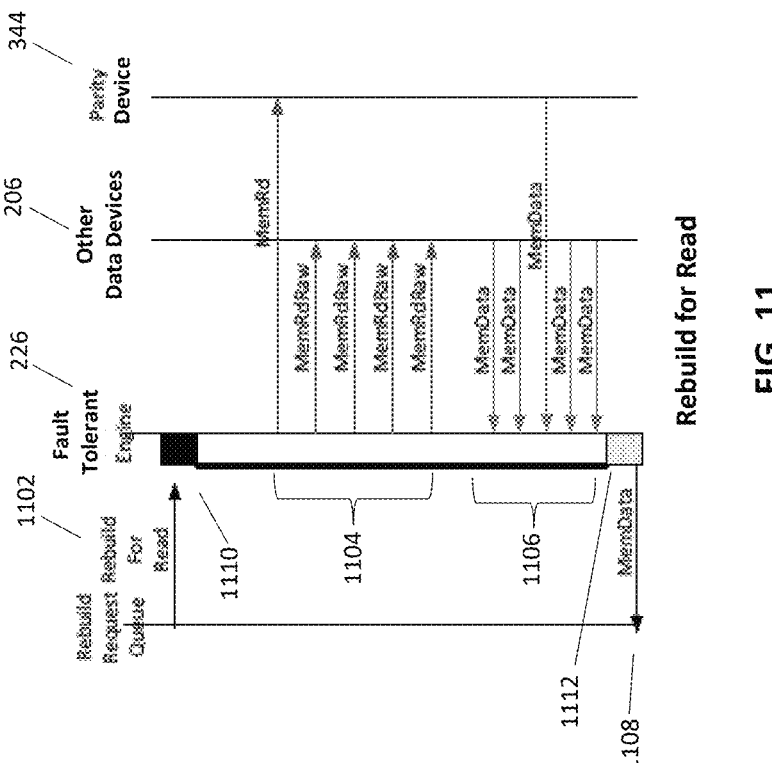
FIG. 11 is a swimlane diagram showing a rebuild for a read operation according to an exemplary embodiment of the present disclosure.
Figure 12:
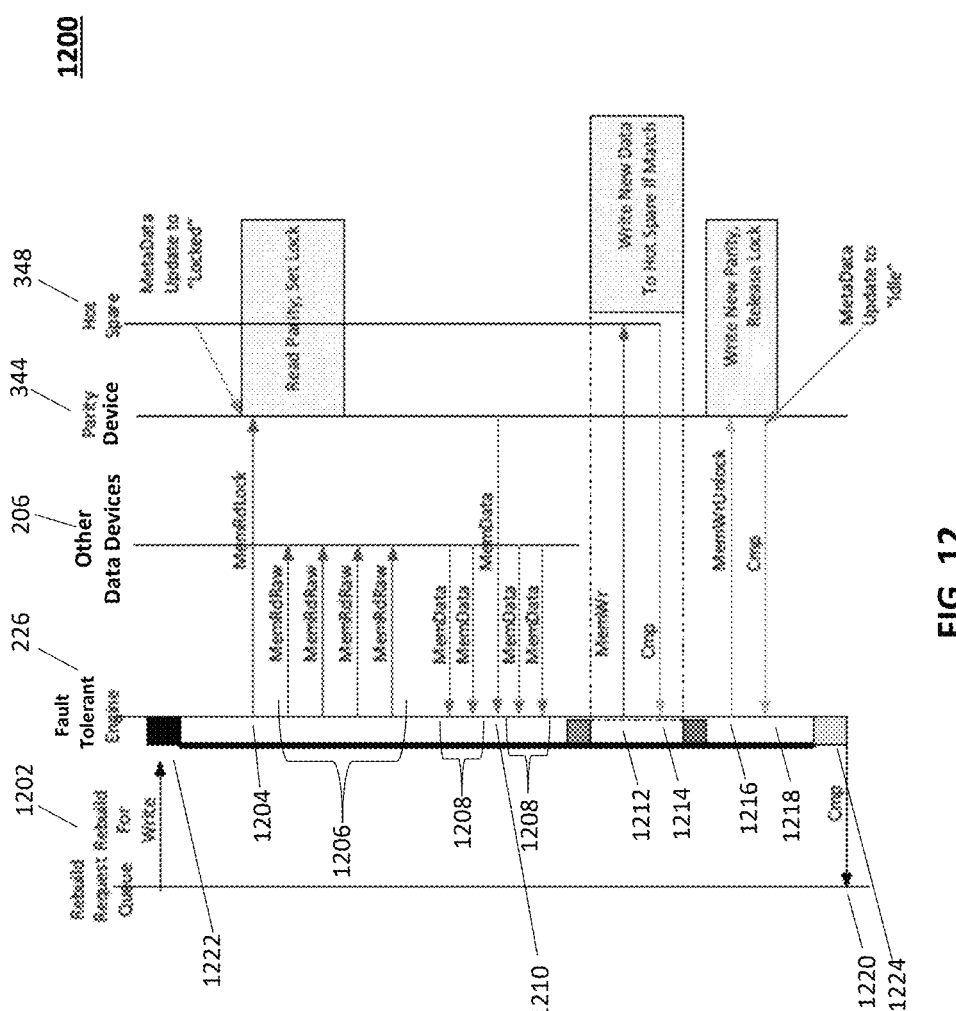
FIG. 12 is a swimlane diagram showing a rebuild for a write operation according to an exemplary embodiment of the present disclosure.

In various embodiments, the system 100, 200, 1400 can implement two different kinds of rebuilds: rebuilds for read (FIG. 11) and rebuild for Writes (FIG. 12). After a swap in of the hot spare device 148, 248, 348, 1448, a subsequent read or write to an invalid line of the hot spare device 148, 248, 348, 1448 returns an invalid state to the RAID controller 124, 224, 1424 which initiates a rebuild or regeneration.

FIG. 10 illustrates Table 2 showing an example of error handling algorithms of the fault tolerant engine for responding to various read and write operations and their failures which can initiate a rebuild. As shown in Table 2 of FIG. 10, a rebuild operation is automatically initiated upon a link down failure (read operation), a media error failure (write operation), or an invalid failure (write operation). A link down failure is an indication that at least one is a link down and is communicated via a response to read requests. An invalid failure indicates that the parity device is not set up.

In a media error failure, the memory device may respond in a manner to indicate that the poisoned return was due to a media error. In some embodiments, the link timeout should be set to be detected in milliseconds (e.g., roughly 10 ms) so that when a CXL device dies in the middle of a read or write operation there is sufficient time for the fault tolerant engine to perform a rebuild operation before the host processor times out. For example, in a 16-way RAID rebuild operation, the fault tolerant engine can be configured to perform the operation in less than 10 ms, which is the time allocated in the timeout hierarchy for the rebuild.

Essentially, during the hot spare device 148, 248, 348, 1448 rebuild based on a read access request or a write access request, the hot spare device 148, 248, 348, 1448, when replacing either a GFAM device or parity check device is initialized with all lines set with invalid data (poisoned). This forces regeneration of the invalid lines on all subsequent accesses. Thus, host accesses will regenerate the hot spare device per accessed line. In other words, subsequent read and write operations can be used to force the fault tolerant engine to rebuild the values in the hot spare device to be consistent with the other devices.

For example, in an operation, a first host access will regenerate a first line of the hot spare device, and then a different host access will regenerate the second line of the hot spare device. At the completion of the rebuilding process, all of the data previously stored on the failed device is written on the hot spare device. Afterwards, during the next read operation or write operation, the system will operate as normal.

It is preferable that the FM 134, 234, 1434 (or another entity) in some embodiments, "walk" all the lines in the hot spare device 148, 248, 348, 1448 to ensure all lines are regenerated simultaneously with the rebuild for a read or write operation. The FM 134, 234, 1434 can be configured to walk the line to provide consistent network updates to perform the transition from the initial configuration which includes the original device to a final configuration including the hot spare device while preserving correctness.

The performance of the RAID system is degraded while a failed disk is being rebuilt. A longer rebuild time increases the probability that another device may fail which may result in permanent data loss or RAID failure. As such, it is ideal to rebuild the RAID expeditiously to prevent RAID failure while also maintaining adequate performance. Therefore, in some embodiments, the system using the FM 134, 234, 1434 (or another entity) may force a rebuild within a relatively short period of time (e.g., within a few minutes to several hours).

FIG. 11 is a swimlane diagram showing an exemplary process 1100 of performing a rebuild for a read operation. The rebuild for a read operation of the process 1100 corresponds to the blocks 820-850 in FIG. 8 depicts a read access scenario when a device responds with poison or a timeout. The FM is informed if a timeout occurs. The poison bit indicates bad data and that valid data is not recoverable.

That is, the target device line needs to be rebuilt using the data of the other devices in the parity group to obtain valid data. When a host access to one of the invalid lines of the hot spare device is received during a read request, this instructs the fault tolerant engine to rebuild the value of the hot spare device to be consistent with the other devices in the parity group. In operation 1102, the rebuild for a read request for the hot spare device is first queued to be written to the fault tolerant engine 226 using "rebuild for read."

In operation 1104, the fault tolerant engine 226 sends a read data request using MemRd to the parity device 344 and using MemRdRaw to all other memory devices 206, which sends the read data request using Mem Data from the parity device 344 and the other memory devices to the fault tolerant engine 226 in operation 1106. In operation 1108, the fault tolerant engine 226 then sends the valid data back to the hot spare device.

A parity group conflict blocking structure is provided and can be activated in operation 1110 when multiple write requests want access to update the same cache line. In operation 1112, the parity group conflict blocking structure is cleared.

FIG. 12 is a swimlane diagram showing a process 1200 of performing a rebuild for a write operation. The rebuild for a write operation process 1200 corresponds to the blocks 940-965 in FIG. 9B depicts a write access scenario during a write access when the fault tolerant engine 226 receives an invalid response from the hot spare device so that the value of the hot spare data has to be regenerated. When a host access to one of the invalid lines of the hot spare device is received during a write request, this instructs the fault tolerant engine 226 to rebuild the value of the hot spare device to be consistent with the other devices in the parity group. In FIG. 12, in operation 1202, the rebuild for a write request for the hot spare device is queued to be written to the fault tolerant engine 226 using "rebuild for Write".

In operation 1204, the fault tolerant engine 226 sends a read parity data request and sets the lock using MemRdLock to the parity device 344, and the parity device 344 updates the status of the metadata bit of the parity device to lock. In operation 1206, the fault tolerant engine 226 sends read data using MemRdRaw to all other memory devices 206. In operation 1208, the other memory devices 206 send using MemData the read data request to the fault tolerant engine 226.

In operation 1210, the parity device 344 sends using MemData the read parity data request to the fault tolerant engine 226. In operation 1212, the fault tolerant engine 226 generates the new data and writes using MemWr the new data to the hot spare device 148 if the new data matches.

In operation 1214, the hot spare device 148 transmits using a response (Cmp) informing the fault tolerant engine 226 that the writing of the new data has been completed. In operation 1216, the fault tolerant engine 226 writes using MemWrUnlock the new parity data to the cache line of the parity device 344 and in response, the cache line lock is released and the metadata is updated to "idle" status.

In operation 1218, the parity device 344 transmits a response (Cmp) informing the fault tolerant engine 226 that the writing and unlocking have been completed.

Then, in operation 1220, the fault tolerant engine 226 sends a response (Cmp) informing the queue manager that the request rebuild has been completed. In FIG. 12, a parity group conflict blocking structure is provided and can be activated in operation 1222 when multiple write requests want access to update the same cache line. In operation 1224, the parity group conflict blocking structure is cleared.

Fabric Fault Tolerant Raid

FIGS. 13-14 show an embodiment of a fabric fault tolerant RAID design according to the present disclosure. In a conventional CXL system, preventative maintenance alone cannot increase the availability of the system to the desired levels, because too many failures occur without warning. For example, CXL fabric failure occurs when a CXL switch dies. The CXL fabric components include the set of CXL switches used in a cluster, CXL cables, and the power delivery system for the CXL switches. A CXL device fails when the device does not respond to CXL requests. The CXL device components include the CXL memory devices and their power delivery system. The present system and method provide a solution to the problem, introducing a fault tolerant system comprising hardware and/or software systems that can keep a cluster operating normally even when a component dies without warning.

FIG. 13 illustrates a simplified version of FIG. 14 to discuss the data packet flow during read and write operations implemented in the fabric fault tolerant RAID design according to the present disclosure. In the example of FIG. 13, system 1300 includes a host device 1302, an MPU 1342, a first spine switch 1312a, a second spine switch 1312b, a first leaf switch 1314, a second leaf switch 1320, a leaf switch connection 1340a, a leaf switch connection 1340b, and a memory device 1306. The host device 1302 can represent one or more host devices coupled to the MPU 1342 via link 1305.

In this embodiment, the system 1300 has a leaf-spine topology, with the MPU 1342 having a link to each spine switch 1312a, 1312b having a link to the leaf switch 1314. For example, the MPU 1342 is connected to the first spine switch 1312a, over connection 1310a, and is also connected to the second spine switch 1312b over connection 1310b. The first spine switch 1312a is connected to the first leaf switch 1314a over connection 1318a. The second spine switch 1312b is connected to the second leaf switch 1314b over connection 1318b. A leaf switch link 1340a, 1340b can be provided to connect the first spine switch 1312a and the second spine switch 1312b.

Both the first spine switch 1312a and the second spine switch 1312b can be connected to the memory device 1306. The memory device 1306 can represent one or more memory devices or GFAM devices coupled to the first spine switch 1312a and the second spine switch 1312b. Connections between leaf switches 1314a, 1314b, and memory device 1306 may be through downlink ports. Accordingly, a leaf switch 1314 is configured to communicate with a spine switch 1312 via an uplink port and is configured to communicate with the memory device 1306 via a downlink port.

It should be understood that two spine switches 1312a, 1312b, two leaf switches 1314a, 1314b and the memory device 1306 are illustrated in this embodiment. However, a network, (e.g., the system 1300), may include any number of switches and/or GFAM devices. For example, in one embodiment, the system 1300 may be a data center and may include hundreds, thousands, or more, switches, memory devices, and/or host devices.

In the network system 1300 with the leaf-spine topology, the MPU 1342 functions as a fabric switch. The host device 1302 can transmit a request to the memory device 1306 by instructing the request to traverse the MPU 1342 and travel a specific path through a hierarchy of switches to finally reach a specific leaf switch connected to the destination memory device. In this example, the MPU 1342 provides two different paths through two different redundant switching topologies to the memory device 1306.

As an example, a first path can include spine switch 1312a connected to leaf switch 1314 via link 1318a, and a redundant second path can include spine switch 1312b connected to leaf switch 1314b via link 1318b. Both switching topologies can be active at the same time such that, for example, the host can instruct a first half of the traffic flow to travel through the first path and a second half of the traffic flow to travel through the second path wherein both traffic flows reach the memory device 1306. Then, a response to the request is transmitted from the memory device 1306 back to the host device 1302.

In the event of a failure in either the first path or the second path, the MPU 1342 can perform an automatic switchover and retry to issue the request down through the functional redundant path. For instance, if the first path fails, the MPU 1342 can retry and issue the request down through the second path. In operation, the MPU 1342 makes a fabric plane selection based on the destination address and the current state of the fabric planes. The fabric plane is a path for transferring the data. Before the MPU 1342 issues requests, it stores a copy of the request along with the initial fabric plane selection. At the time of issuance, the MPU 1342 starts a timeout counter. If the timeout counter fires, the MPU 1342 issues the same request using the alternative fabric plane.

Some of the objectives achieved by network systems of the present disclosure include, but are not limited to, the ability to support N+1 GFAM, support single switch parity groups, support single fabric parity groups (without MPU), support redundant fabric parity groups (with or without MPU), support active-active redundant switch fabric, support identification and restoration of parity group checksum in all scenarios, support in memory atomic operations via fault tolerant engine, and support masked write operations. The result is that these advantages can maximize throughput for memory region with RAID support and minimize latency for memory regions with RAID support.

In embodiments, having a single switch, such as illustrated in the example of FIG. 1A, an MPU may be optional because there is only a single path.

In an embodiment without an MPU, the system can include two ports extending from the host. When a failure occurs, the host will receive a response back to indicate that there is a failure. In response, the host can take down at least that specific application. Then, the FM, which has the responsibility of managing the fabric, can recognize that there is a failure of one of the two redundant fabrics. The FM can then notify all the hosts to use the other fabric that is still functional. In this embodiment, the process of using the FM to keep up the application can be a manual process and not an automatic switchover process using an MPU, as described above. In this manual process, when an application goes down, the FM can reconfigure the system and the host can restart the application.

Thus, the system of the present disclosure is capable of providing support for both approaches of an automatic failover using an MPU and a manual failover using the FM.

In various embodiments, the system provides support for active-active redundant switch fabrics. The system can provide access simultaneously down multiple paths, such as the two paths shown in FIG. 13, to the memory device. The multiple paths can be simultaneously accessing essentially the same line in memory, but using different paths. From a cost perspective, it is desirable to have multiple paths active such that the customer is not paying for an entire redundant switch fabric, which is not being used all the time.

In embodiments, the system provides support for identification and restoration of parity group checksum in all scenarios. The system can be configured to predict all possible scenarios of errors and address all these scenarios.

Embodiments of the present disclosure provide support in memory atomic operations via a fault tolerant engine. In the present disclosure, with the use of a host (e.g., X86 host), the system can have the ability to lock a portion of data in its cache, perform an operation on the data, and then unlock the data. The system can implement a read-modify-write to that location in the cache, and because of the lock, the system keeps all other threads of execution on that same host or different hosts from accessing it and modifying it during the time that one of the processors is performing a read-modify-write.

According to the present disclosure, this is an example of the atomic aspect where the system modifies the memory in an atomic manner to obtain a consistent result. The system performs a read, a modify, and a write, while no other reads or writes are performed therein between.

Accordingly, in embodiments of the present disclosure, the system can perform read-modify-write on a location in a memory device memory by leveraging the fault tolerant engine mechanism in the leaf switch. As a result, the system enables a large number of hosts to implement atomic operations through the leaf switch by accessing the memory very effectively so that there is very high throughput.

In contrast, if the atomic operations were performed in a host (a first host), the number of operations performed would be relatively slow. In such a scenario, if a host (a second host) wanted access to the data, the second host would have to send a request to the first host requesting the data. Then, the first host would send the requested data to the second host. This results in a lot of latency while the second host waits for the data to travel through all the switches. Performing the atomic operations at the leaf switch results in a very high number of atomic operations and a much higher throughput.

In various embodiments, the system maximizes throughput for a memory region with RAID support. One objective of the system is to maintain a very high rate of reads and writes at the memory device, as much as possible. Although RAID operations are performed at the memory device, with this implementation, the system may achieve a very high throughput of read and write operations, which results in high-bandwidth. At the memory device, the RAID scheme can be used to provide an enhanced form of parity check protection. A second set of parity data is written across all devices in the memory group to avoid data loss in case of error. When a memory device in the group fails its parity check, data is rebuilt using parity information coupled with data on the other devices in the group.

In embodiments, the system minimizes the latency for the region of memory with RAID support, because the host processor cannot tolerate high latency very well. Therefore, the system minimizes the latency.

FIG. 14 illustrates a block diagram of an exemplary fabric fault tolerant RAID design 1400 according to the present disclosure. FIG. 13 presents a general approach to provide a fault tolerant system, while FIG. 14 shows a more detailed embodiment of such fault tolerant system, which can be either hardware or software systems that can keep a cluster operating normally even when a component fails without warning.

The embodiments of the fabric fault tolerant RAID design can extend the basic RAID architecture (FIGS. 1A-2) to be resilient to CXL switch failures as well as device failures. Thus, many components are the same as in the basic RAID architecture (FIGS. 1A-2), are labeled with similar reference numerals, and will not be described again. In this embodiment, the new components are MPUs 1442a, 1442b and a more sophisticated lock controller 1438a, 1438b, 1438c. A leaf switch connection 1440 is provided between a first fabric switch 1408a and a second fabric switch 1408b.

The MPU 1442a, 1442b can be configured to keep a record of all outstanding read and write requests, and if any one request exceeds the MPU 1442a, 1442b request timeout, the MPU 1442a, 1442b reissues the request down an alternate fabric plane using leaf switch connection 1440. In some embodiments, the lock controller 1438a, 1438b, 1438c can be included in one or more of the memory devices 1406 to hold or preserve the "old" write data for all active parity group updates. Therefore, in the event of a switch failure in the middle of a parity group update, the lock controller 1438a, 1438b, 1438c will contain the data necessary to keep the parity group in a consistent state.

Since CXL memory requests (memory reads and memory writes) do not have any side effects, it is safe for the system 1300, 1400 to read the same memory location multiple times and it is safe to write the same location with the same write data multiple times. This scenario may happen in the event of a switch failure occurring just before a read or a write response is delivered to a host.

Figure 15A:
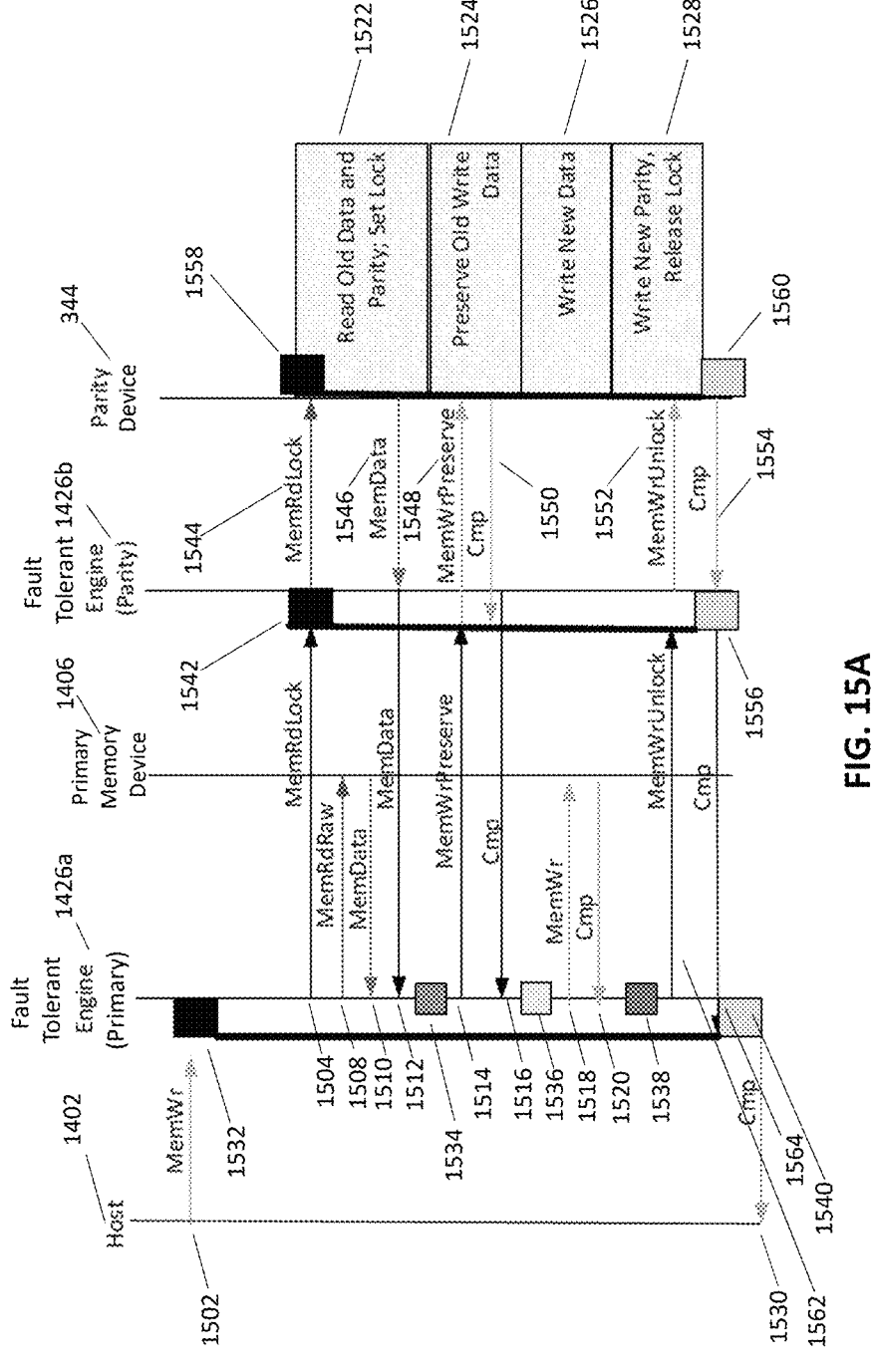
FIG. 15A is a swimlane diagram showing a write flow with write preservation operation according to an exemplary embodiment of the present disclosure.

With the fabric fault tolerant design of the system 1300, 1400 in FIGS. 13, 14 and as described with regards to FIG. 15A, it is possible in some scenarios for a switch to die after it has updated the home location and before it has updated the parity location. To address this case where consistency can be lost, the write flow is updated, so that the lock controller 1438 preserves the state of the home location data. If a fault tolerant engine 1426, running on the alternative fabric plane needs to complete the write operations, the fault tolerant engine 1426 can retrieve the original home data from the lock controller 1438 in the fault tolerant memory devices 1406. In FIGS. 14-15, the fault tolerant engine is an enhanced fault tolerant engine since the basic write algorithms are enhanced.

The lock controller 1438 in the memory devices 1406 ensures that only one write request is modifying a parity group at a time. The lock controller 1438 also allows modifications partially performed by one fabric plane to be picked up and completed by the redundant fabric plane. To eliminate the need for end-to-end retries and forward progress screens, the lock controller 1438 maintains a conflict list and determines the order in which read and write requests are serviced.

Additionally, the lock controller 1438 may also momentarily block memory write requests trying to access the same parity groups as in-flight updates. One fault tolerant engine waits for a locking fault tolerant engine to respond with a "Normal" response. In some embodiments, the lock controller 1438 may use a lock pipeline (not shown) which can receive new requests, for example, at a rate of one per core clock. The lock pipeline can be completed after just several cycles and can report the result of the conflict checking, as shown in FIG. 15B.

Active requests in the lock controller 1438 can time-out. When tracker entries time-out, the timeout bit in the entry can be set, causing the lock pipeline to start detecting timeout hits. To avoid deadlocks, in some embodiments, there must be at least one entry in the active lock tracker dedicated to servicing Fabric A requests. In FIG. 14, Fabric A may include spine switch 1412a and leaf switch 1414a. Likewise, at least one entry in the active lock tracker must be dedicated to servicing Fabric B requests. In FIG. 14, Fabric B may include spine switch 1412b and leaf switch 1414b. This reservation scheme ensures the lock controller 1438 continues to make forward progress, even in the situation where one fabric plane dies.

In FIGS. 13, 14, the MPU 1342, 1442a, 1442b records, for example, in an active memory request tracker (not shown), all the CXL.mem read requests and write requests that a processor has active in the CXL fabric. If the MPU 1342, 1442a, 1442b runs out of resources in the active memory request tracker, it can flow control incoming read and/or write requests. This may be possible, in embodiments, where RAID architecture is configured to only support software coherency. The MPU 1342, 1442a, 1442b can perform a fabric plane selection based on the destination address and the current state of the fabric planes. Before the MPU 1342, 1442a, 1442b issues requests, it stores a copy along with the initial fabric plane selection. At the time of issuance, the MPU 1342, 1442a, 1442b starts a timeout counter. If the timeout counter fires, the MPU 1342, 1442a, 1442b issues the same request using the alternative fabric plane.

FIG. 15A is a swimlane diagram showing a write flow with write preservation operation according to an exemplary embodiment of the present disclosure. In some embodiments, a switch may die after the system has updated the home location and before it has updated the parity location. To address this case where consistency can be lost, the write flow is updated, so that the lock controller 1438 preserves the state of the home location data.

In operation 1502, all write requests are routed using MemWr to the fault tolerant engine 1426a which functions as the master for coordination of writes (and reads). In the embodiments of FIGS. 14-15, the fault tolerant engine is an enhanced fault tolerant engine since the basic write algorithms are enhanced. This fault tolerant engine 1426a performs the conflict resolution with other requests to the same home agent.

If there is a conflict at the fault tolerant engine 1426a, in operation 1532, the parity group conflict blocking structure is activated and a subsequent conflicting request is blocked and held in a conflict list queue and processed after the request received first finishes.

If no conflict exists at the fault tolerant engine 1426a, then in operation 1504 to process the request received first, the fault tolerant engine 1426a sends a request to the fault tolerant engine parity device 1426b to read data and to lock the parity cache line using MemRdLock.

The parity engine 1426b performs further conflict detection to ensure that only one request is modifying the parity group parity at a time. If there is a conflict at the fault tolerant engine parity device 1426b, in operation 1542, the parity group conflict blocking structure is activated and the subsequent lock request is blocked and held in a conflict list queue and processed after the first lock request received finishes.

In operation 1544 to process the lock request received first, the fault tolerant engine 1426b requests to read data from the parity device 344 and to lock the parity cache line using MemRdLock.

If there is a conflict at the parity device 344, in operation 1558, the parity group conflict blocking structure is activated. The lock controller 1438 ensures that only one write request is modifying the parity group at a time. The lock controller 1438 maintains a conflict list and determines the order in which requests are serviced.

In operation 1522, the old data and the parity data are read and the lock is set.

In operation 1508, the primary fault tolerant engine 1426a reads a cache line of a primary memory device 1406 using MemRdRaw.

In operation 1510, the memory devices 1406 respond with the requested data using a MemData response to the fault tolerant engine 1426a. In operation 1546, the parity device 344 responds with the requested data using a MemData response to the fault tolerant engine 1426b. In operation 1512, the fault tolerant engine 1426b transmits, as a response, the requested data (the old data and the parity data) together with the locked state to the primary fault tolerant engine 1426a. In operation 1534, the RAID parity on the cache line and the poison bit are calculated.

In some embodiments, the lock controller 1438 can be included in one or more of the memory devices 1406 to hold or preserve the "old" write data for all active parity group updates, in operation 1524. The lock controller 1438 also tracks all parity groups that are in the process of being modified. Therefore, in the event of a switch failure in the middle of a parity group update, the lock controller 1438a, 1438b, 1438c will contain the data necessary to keep the parity group in a consistent state.

In the embodiments, a switch may die after the system has updated the fault tolerant engine 1426a and before it has updated the parity device 344. To address this case where consistency can be lost, the write flow is updated, so that the lock controller 1438 preserves the state of the home location data. Therefore, before the writing of the new data, in operation 1514, the fault tolerant engine 1426*a* requests to write the old write data to preserve the old write data at fault tolerant engine 1426*b* using a MemWrPreserve.

Operation 1548 writes the old write data to preserve the old write data at parity device 344 using a MemWrPreserve. In response, operation 1524 preserves the old write data. The parity device 344 transmits a response (Cmp) in operation 1550 that the preservation has been completed. The fault tolerant engine 1426*b* transmits a response (Cmp) in operation 1516 that the preservation has been completed.

In operation 1536, the fault tolerant engine 1426*a* waits for the fault tolerant engine 1426*b* to respond with a "Normal" response.

In operation 1518, when the fault tolerant engine 1426*a* requests to write data using MemWr to the cache line of the target primary memory device 1406, the data requested to be written to the cache line of the target primary memory device 1406 is written in operation 1526, and the target primary memory device 1406 transmits a response (Cmp) in operation 1520 informing the fault tolerant engine 1426*a* that the writing has been completed.

In operation 1538, the fault tolerant engine 1426*a* waits for the primary CXL device 1406 to complete the write. In operation 1562, the fault tolerant engine 1426*a* requests to write the new parity checksum data and unlock the cache line using MemWrUnlock to the fault tolerant engine 1426*b*.

In operation 1552, the fault tolerant engine 1426*b* requests to write the new parity checksum data and unlock the cash line using MemWrUnlock to the parity device 344. The data requested to be written to the parity device 344 is written and the cache line lock is released, in operation 1528, which unlocks the entire parity group.

In operation 1560, the conflict blocking structure is cleared. In operation 1554, the parity device 344 transmits a response (Cmp) informing the fault tolerant engine 1426*b* that the writing and unlocking have been completed.

In operation 1556, the conflict blocking structure is cleared. In operation 1564, the fault tolerant engine 1426*b* transmits a response (Cmp) informing the fault tolerant engine 1426*a* that the writing and unlocking have been completed.

In operation 1540, the fault tolerant engine 1426*a* conflict blocking structure is cleared. Then, in operation 1530, the fault tolerant engine 1426*a* sends a response (Cmp) informing the host 1402 that the writing has been completed.

Figure 15C:
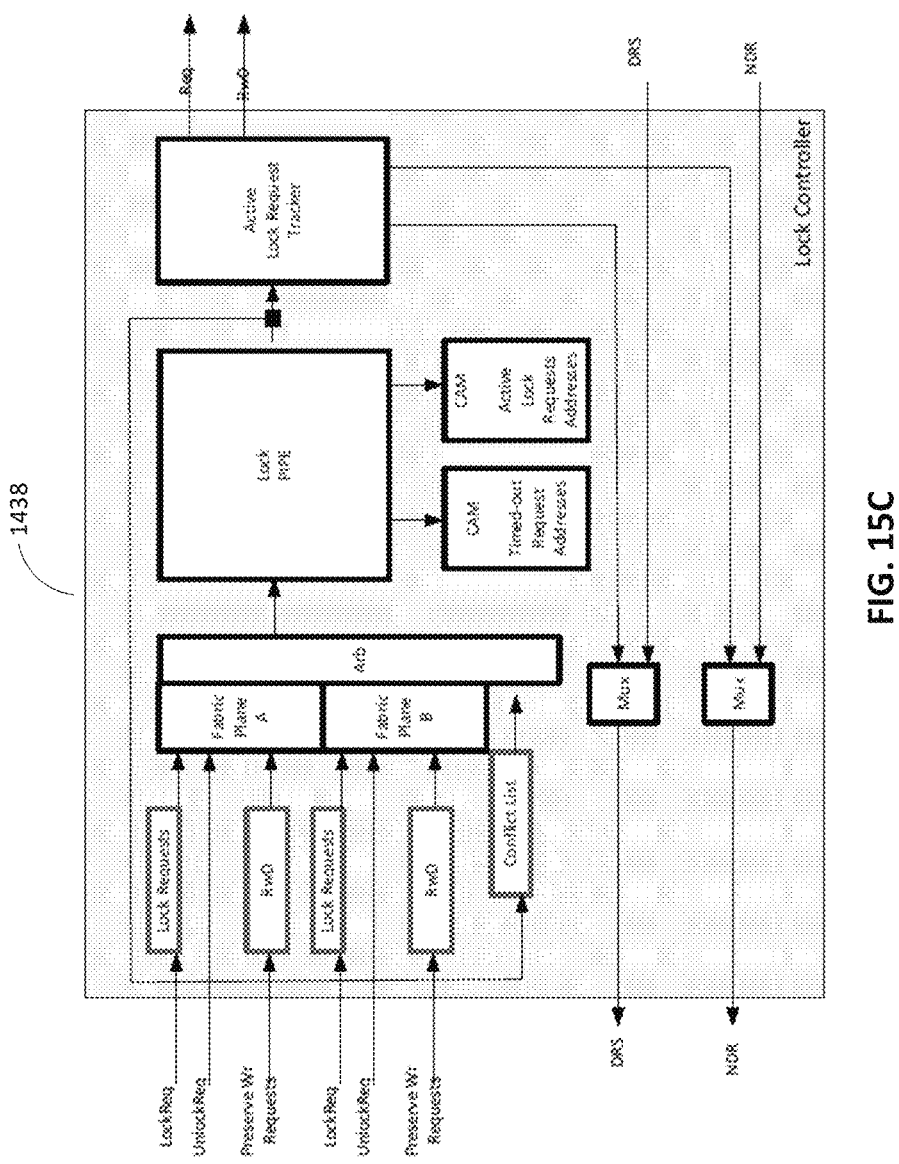
FIG. 15C illustrates a detailed block diagram of an exemplary lock controller according to the present disclosure.

In some embodiments, the lock controller 1438 may include a lock pipeline. As shown in FIG. 15B and FIG. 15C, the lock pipeline may generate a report indicating different types of results of the conflict check performed by the lock controller 1438. The result types may include, for example, lock no conflict (LockNoCnflt), lock conflict (LockCnflt), lock hit timeout no preserved data (LockHitTimeoutNoPreservedData), and lock hit timeout preserved data (LockHitTimeoutNoPreservedData).

System Failure Scenarios

The present system and methods provide solutions to diagnosis and handle some failure scenarios that can occur within the system include a CXL switch connection down and a CXL connection between the leaf switch and GFAM device down, which can be explained using the examples in FIGS. 13-14. Referring now to FIGS. 13-14, the failure scenario of a CXL switch connection down is described. When a CXL switch connection is down and a request is sent from a host device 1302, 1402 to traverse an uplink 1310, 1410 or a downlink 1318, 1418 of a spine switch 1312, 1412, the host device 1302, 1402 is capable of recognizing that it is attempting to send a data packet through a connection that is inoperable. According to the CXL standard protocol, the host device 1302, 1402 is capable of recognizing that the data packet cannot be sent as such it will generate a poison response. The poison response indicates that somewhere along the path, the proper data cannot be obtained.

If the system 1300, 1400 includes an MPU 1342, 1442, in a failure scenario of a CXL switch connection down and the data transmission has been rendered inoperable through a first path, the system 1300, 1400 performs an automatic failover. During the automatic failover, requests which would otherwise be processed through the first path will be routed to an alternate path of an alternate fabric.

If the system 1300, 1400 does not include an MPU 1342, 3442, the host device 1302, 1402 connects directly to the CXL switch 1312, 1412 via connections 1310, 1410. In this situation, in a failure scenario of a CXL switch connection down, a poison message is sent to the host device 1302, 1402 in response to the CXL switch connection down failure. Attempts of retrying the request, as described above, can be made. If the attempts to retry the request is unsuccessful, then in some embodiments, the application may have to be taken down if there are no other means available of retrying the request.

Referring now to FIGS. 13-14, a failure scenario of a CXL connection between a leaf switch and a GFD down is described. In a redundant system embodiment failure scenario where a CXL connection 1316*a*/1316*b*, 1416*a*-1416*f* between a leaf switch 1314*a*/1314*b*, 1414*a*/1414*b* and the memory device 1306, 1406 is down with a redundant fabric and an inter leaf switch connection 1340, 1440 remains up, then the fault tolerant engine 1426 retries and sends the request on the leaf switch connection 1340, 1440 on the alternate CXL connection. If a valid completion response message is received indicating that the request was completed using the alternate CXL connection, the fault tolerant engine 1426 then responds to the host device 1302, 1402 with the response and informs an FM 1434 of the memory device link failure (i.e., that the memory devices 1306, 1406 have connections 1316, 1416 that are down).

If an invalid completion response message is received indicating that the request was not completed, the fault tolerant engine 1426 then performs the line regeneration using the cache line to send the response back to the host device 1302, 1402 and informs the FM 1434 of the failure of the memory devices 1306, 1406. The fault tolerant engine 1426 reports all the information available regarding the failure to the FM 1434 so that the FM 1434 can take the necessary action (i.e., reconfigure or swap in hot spares) to return the failed memory devices 1306, 1406 to "usable status."

In another failure scenario embodiments where a CXL connection 1316*a*/1316*b*, 1416*a*-1416*f* between a leaf switch 1314*a*/1314*b*, 1414*a*/1414*b* and the memory devices 1306, 1406*a*-1406*c* is down, diagnosing the failure by the fault tolerant engine 1426 may be difficult. In response to the failure, the fault tolerant engine 1426 sends a poison response to the host device 1302, 1402 and reports all the information available regarding the failure to the FM 1434 so that the FM 1434 can take the proper action (i.e., reconfigure or swap in hot spares) to return the failed component to "usable status."

Examples of these types of failure scenarios which may generate the poison response include: a system without a redundant fabric (i.e., a non-redundant system); a system wherein the failure occurs at the inter leaf switch connection 1340, 3440 and renders it inoperable; or a system experiencing multiple failures in the connections between the CXL connection 1316, 1416, the leaf switch 1314, 1414 and the memory devices 1306, 1406.

As shown in FIG. 16, in some implementations of the present disclosure, the RAID architecture extends the CXL.mem protocol and the CXL.UIO protocol to provide more responses for read and write requests. Examples of these responses, which are illustrated in Tables 3, 4, and 5 of FIG. 16, enable the fault tolerant engines to improve cluster availability. The MPU 1342, 1442 records all the CXL.mem read and write requests that a processor has active in the CXL fabric. An active writing request tracker includes a list of all active requests which are in the process of modifying the memory device. The RAID memory pipeline makes sure that no two requests are modifying the same parity group. If the MPU runs out of resources in the active memory request tracker, it can control the flow of the incoming read and/or write requests, because the RAID architecture, in some embodiments, can be configured to support only software coherency.

Table 3 shows examples of RAID CXL responses. For example, during operation, the fault tolerant engines may be asked to update the metadata bit (FIG. 3) on reads and writes, and the fetched data will be returned to the host for Fully Functional Read Request Flows (FIG. 4) and Fully Functional Write Request Flows (FIG. 5). However, if a RAID rebuild is required, the fault tolerant engine will return a DRS packet with (MetaField=No-Op) indicating there is no useful information in the Meta Value field as shown in Table 3.

In FIG. 16, Table 4 shows examples of RAID Read Response Codes. Table 5 shows examples of the RAID write response codes.

As shown in FIG. 17, in some embodiments, the RAID architecture can extend the CXL.mem protocol and the CXL.UIO protocol by providing CXL proprietary extensions that are beyond the standard CXL protocol. According to the standard CXL protocol, the memory devices 1306, 1406 can only provide two types of responses: a valid data response or a poison response. According to the present disclosure, similarly, as described above with regards to the locked meta state feature, additional 2-bit code are provided in a completion status encoding scheme (FIG. 17). Thus, the system and method of the present disclosure are capable of sending back both meta state information and the completion code responses.

FIG. 17 illustrates Table 6 showing the CXL proprietary extensions for the CXL.mem/UIO response completion codes for two scenarios: when poison is not set and when poison is set. As shown in Table 6 of FIG. 17, when the poison is not set, the poison value=0 and the three CXL.mem/UIO response completion codes are "locked" (if the system is retrying locked lines), "invalid" (the value of "invalid" meta state) and "valid".

When poison is set and the poison value=1, the three CXL.mem/UIO response completion codes are "meta state poison" (previously set by the host device), "uncorrectable memory", and "link down". When a poison response is sent back, the fault tolerant engine conducts a further inquiry to determine the reason why the poison response was sent back. Under the CXL protocol, the poison is stored in the memory so that the subsequent read operation knows that the data is corrupt.

The system determines whether the poison bit was previously set by the host or is it because there is uncorrectable memory. If there is an uncorrectable memory, the fault tolerant engine can obtain the correct value by rebuilding that parity group and sending the value back. If the previous host sent the poison bit, the fault tolerant engine cannot correct the value because the last time it was written it was poisoned. Sending the poison response back is the correct action to take. If a link is down, the fault tolerant engine needs to determine whether to send the request down a different path or if there is bad data in the actual backup.

The information regarding the meta state poison, uncorrectable memory, and link down status, all need to be sent back to the fault tolerant engine so that the appropriate action can be taken. Knowing the distinctions between the types of completion status messages is important because it helps to determine the corrective action taken. The completion status encoding schemes demonstrate how the system encodes that information and the response packets so that it works properly although these codes are not defined in the CXL standard.

As shown in Table 3 of FIG. 16 and Table 6 of FIG. 17, using the CXL.mem, the responses can be encoded using the meta fields and meta value bits so that in the response packets there are two 2-bit fields. Using the CXL.uio, the responses can be encoded in the attribute field which is a 2-bit field. And we can use it to encode the error response. If the original request is a CXL.mem request, the system sends back a CXL.mem response. If the original request is a CXL.UIO request, the system sends back a CXL.uio response. Thus, the type of the original requests dictates whether the response sent back is a CXL.mem response or a CXL.uio response.

Preemptive Maintenance

Figure 18A:
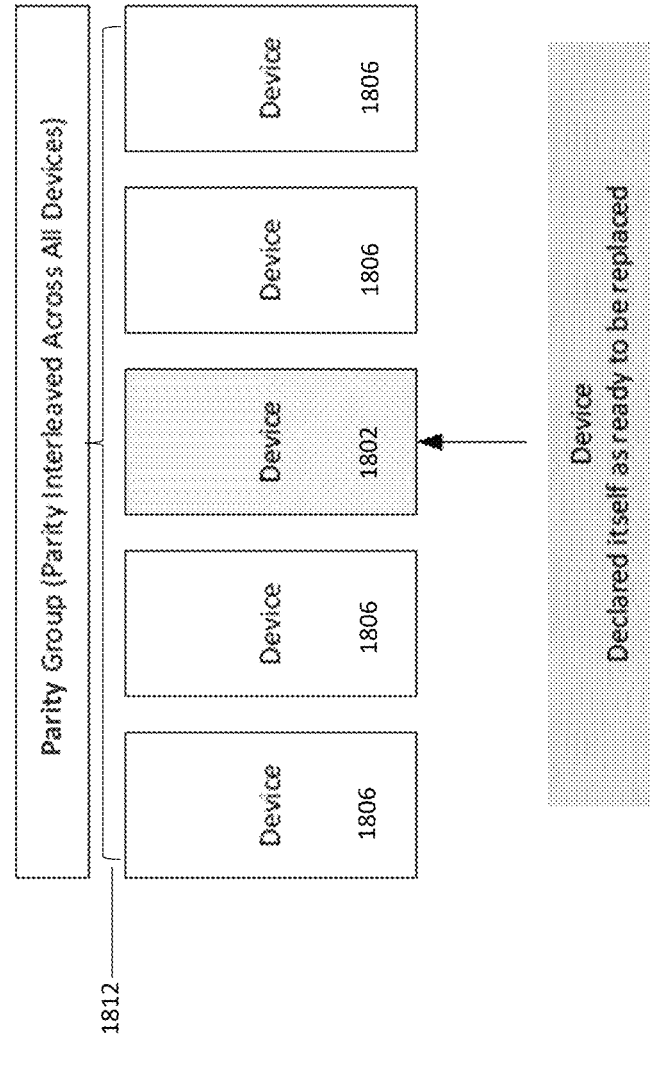
FIGS. 18A-18C illustrate a preemptive maintenance process according to an exemplary embodiment of the present disclosure.

As shown in an embodiment of FIGS. 18A-19, the FM 134, 234, 1434 can implement a preventative/preemptive maintenance to replace a "ready to be replaced" component by preemptively adding a new device and rebuilding the data to the new device before the impending failure can occur. As discussed above, in various examples, the FM 134, 234, 1434 may perform maintenance of fabric-wide switch configurations. The FM 134, 234, 1434 can add or remove memory devices 106, 206, 1406 from the system. In embodiments, a new memory device, such as a new CXL device, can be added to replace a memory device already included within a cluster in the system.

In embodiments, the memory devices 106, 206, 306, which can be added or removed, may be a hot spare device 148, 248, 348, 1438 and/or a new memory device. The example systems and methods disclosed herein utilize values representative of the status of the memory devices 106, 206, 1406 measured by the FM 134, 234, 1434 to proactively monitor and/or analyze the memory devices 106, 206, 1406 to automatically trigger replacement or maintenance of a memory device based on this analysis.

The FM 134, 234, 1434, which functions as the management system, can be configured to perform "Health Status" monitoring on the components of the cluster. All the major components of a cluster can be configured to be self-diagnosing components, which will inform the management system (e.g., FM 134, 234, 1434) when the components are "ready for replacement." In a case that any memory device in the system begins to experience too many media errors such that it needs to be replaced, the memory device can transmit the warning information to a mailbox of the FM 134, 234, 1434.

As shown in FIG. 18A, the memory device can declare itself as being ready to be replaced. The FM 134, 234, 1434 can detect the memory device with a HealthStatus indicator to trigger a "Hardware Replacement Needed" event. In a case of a switch failure, such as a CXL switch, the FM 134, 234, 1434 can monitor the switches based on the frequency of link failure rates which can be used as an early indication of impending switch failure.

Figure 18B:
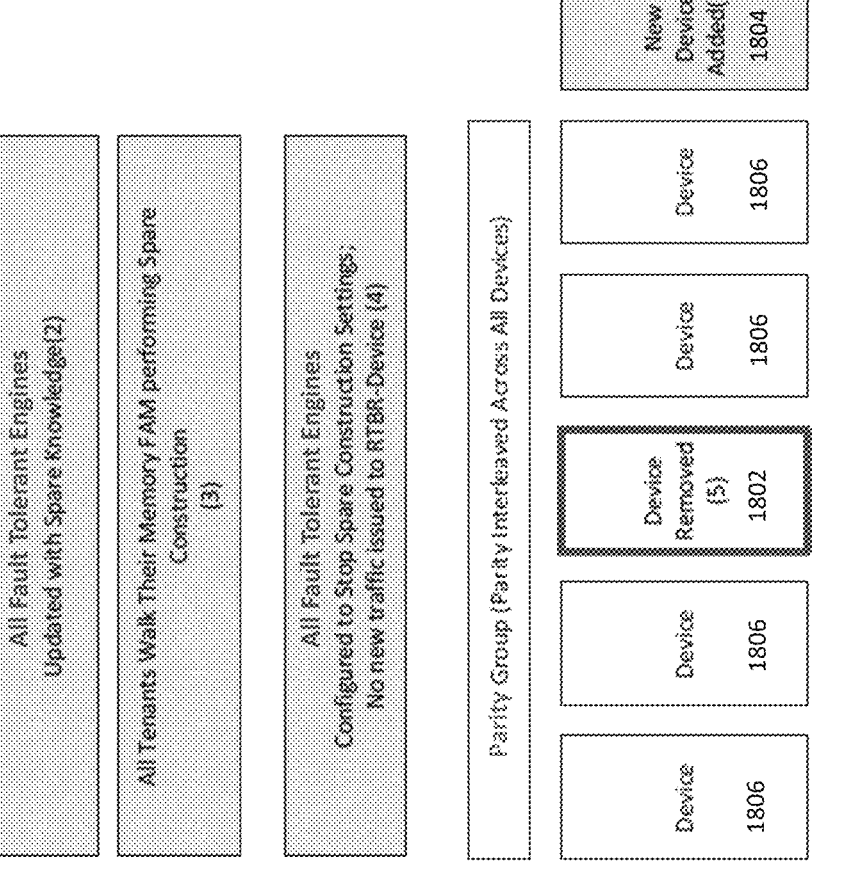
Figure 18C:
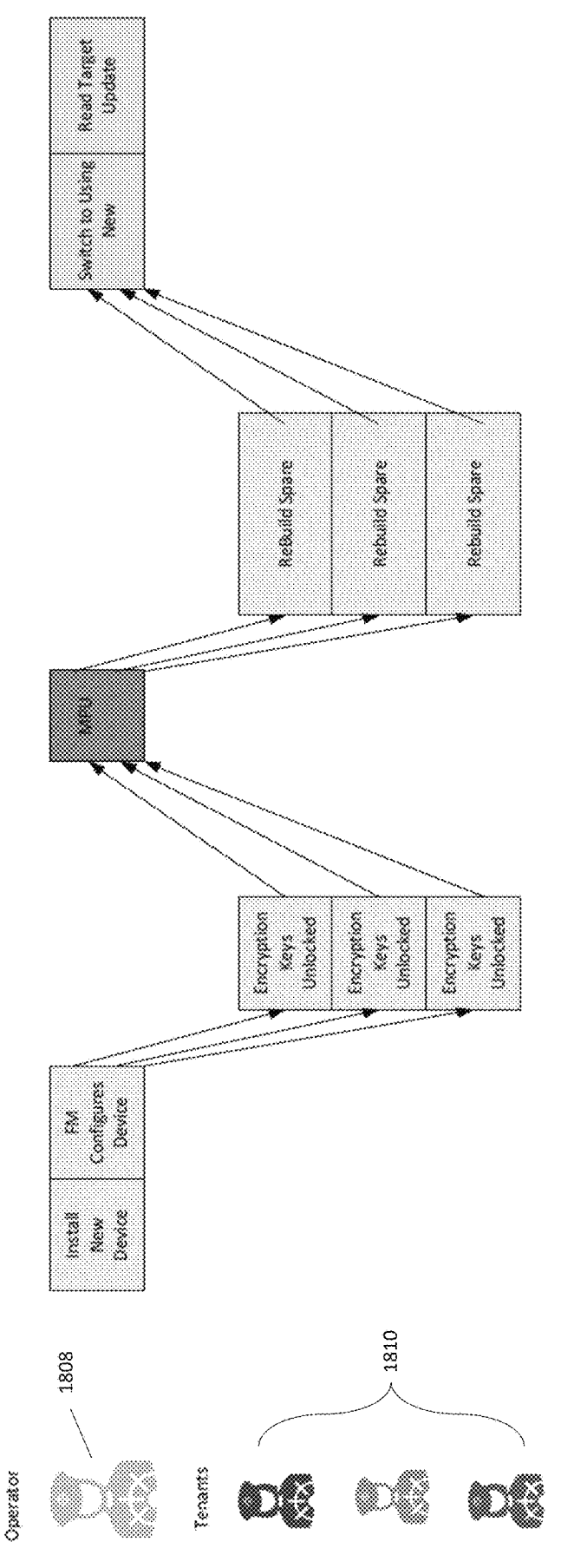

FIGS. 18A-18C illustrate the preemptive maintenance process of adding a new memory device to replace a memory device already included within a cluster in the system. FIG. 19 shows an example flowchart 1900 for the preemptive maintenance process depicted in FIGS. 18A-18C.

In the example of FIGS. 18A-18C, the system may include system operators 1808 and system tenants 1810 in a distributed edge computing environment. A memory device 106, 206, 1406 of the cluster of memory devices can be coupled to and shared by multiple tenants 1810 in the distributed edge computing environment. In an edge cloud in a multi-tenant setting, services and applications can be requested and shared by many users or multiple tenants. In various embodiments, the multiple tenants may be of the same or different types of systems.

For example, a GFAM device can contain both volatile and non-volatile memory together, such as DRAM and flash memory. The GFAM device effectively acts as a shared pool of memory. It will be understood that in some scenarios, the hardware platforms or configurations may operate on a modifiable platform, such as to enable the use of swappable or interchangeable hardware components at different layers of the edge cloud. In this manner, a system operator 1808 at the tenants 1810, shown in FIG. 18C, may be able to upgrade the deployment of the edge system with newer hardware and specify the rules for sharing data provided to the cluster from the tenants 1810.

In block 1905, the FM 134, 234, 1434 can monitor the operating status of all the data devices 1806 by receiving heart status information. One of the data devices can determine that it is at the point of failure as detected by, for example, a count of media errors that reaches a predetermined threshold that indicates an impending failure. In block 1910 and as shown in FIG. 18A, the data device 1806 can declare itself as being ready to be replaced by transmitting a HealthStatus warning containing information that a hardware replacement is needed to the mailbox of the FM while the system remains running.

In block 1915, the FM 134, 234, 1434 detects the HealthStatus warning from data device 1802. In block 1920 and as shown in FIG. 18B, in response, the FM selects one data device and the system operator 1808 adds the selected data device as a new data device 1804 to replace the "Ready for Replacement" device 1802 to improve the continuous availability of the system.

In block 1925, all fault tolerant engine CSRs are updated. The CSRs define the interleave of the devices of the parity group 1812 to determine the specific destination fault tolerant engine for a request. Each fault tolerant engine can be configured to maintain a record of the location of the spare device of the parity group.

In block 1930, all tenants 1810 perform a spare device data reconstruction by having each tenant 1810 read every location of an edge computing device, such as a GFAM device, that the tenant 1810 is using. The FM 134, 234, 1434 configures the new data device 1804. At each tenant, the encryption keys are unlocked. The MPU records all the read requests and write requests that are active in the fabric. Each tenant 1810 rebuilds the spare (i.e., the new data device 1804). Each tenant 1810 switches to using the new data device 1804 and reads the new data device 1804 such that the subsequent reads (or writes) regenerate the data previously stored on the replaced data device 1802 to the new data device 1804.

In block 1935, the fault tolerant engine CSRs are updated. In block 1940, the old data device 1802 is removed from the parity group.

Figure 20:
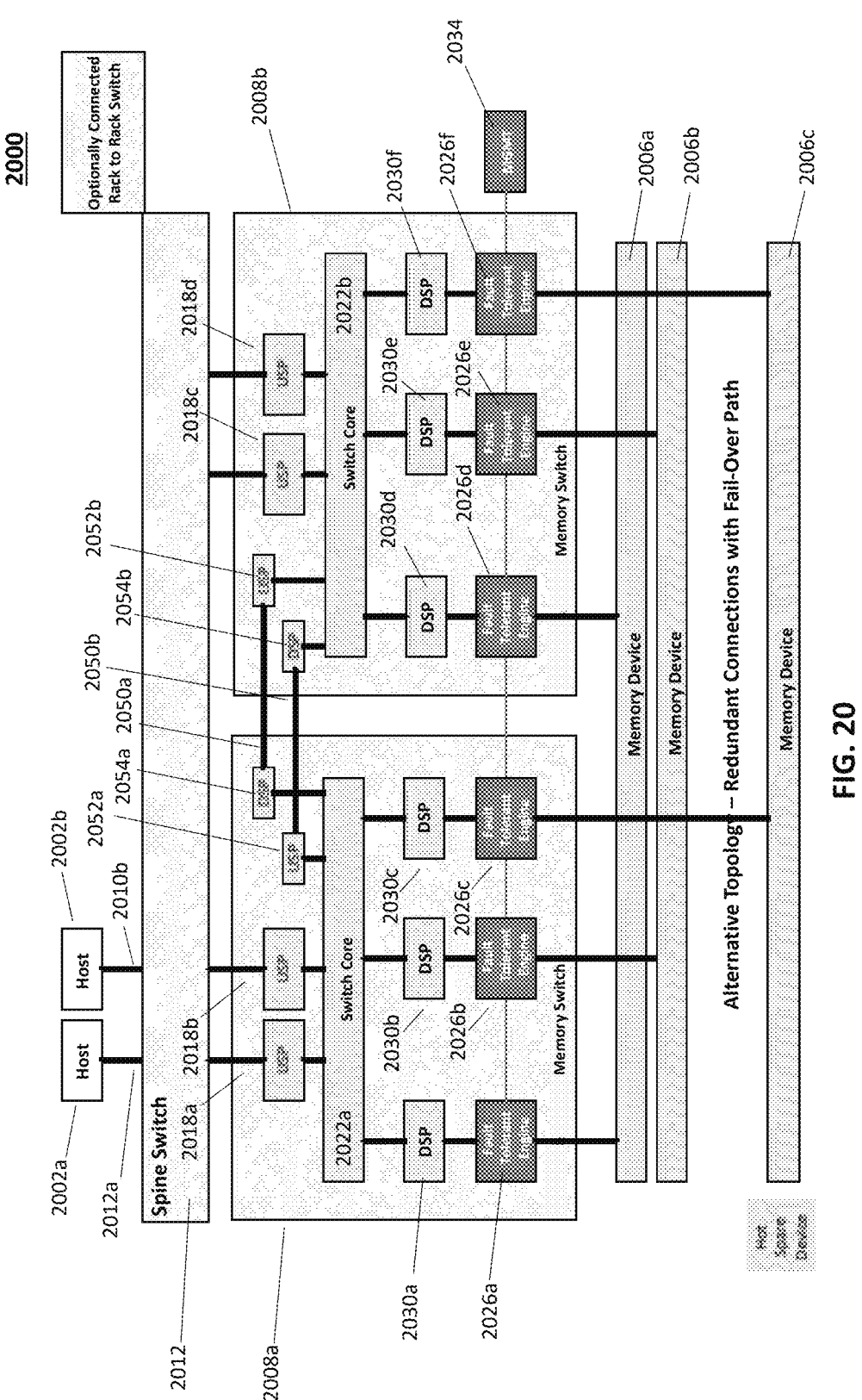
FIG. 20 illustrates an alternative embodiment of the fabric fault tolerant RAID design according to the present disclosure.

FIG. 20 illustrates an alternative embodiment of the fabric fault tolerant RAID design 2000 in comparison to FIG. 14. FIG. 20 illustrates an alternative topology having redundant connections with fail-over paths. For the sake of brevity, only aspects of the fabric fault tolerant RAID design 2000 that are different from the fabric fault tolerant RAID design 1400 in FIG. 14 will be described below. To the extent illustrated in FIG. 14, similar components in FIG. 20 are designated by similar reference numerals.

In comparison to FIG. 14, the embodiment of the alternative fabric fault tolerant RAID design 2000 in FIG. 20 includes a single spine switch 2012, but does not include an MPU, a RAID routing block, a leaf switch connection, and the lock controller 1438. The single spine switch 2012 connects to hosts 2002a, 2002b via connections 2010a, 2010b, respectively. The single spine switch 2012 connects to a first fabric switch 2008a via connections 2018a, 2018b and connects to a second fabric switch 2008b via connections 2018c, 2018d.

Redundant connections with failover paths 2050a, 2050b are provided between the first fabric switch 2008a to the second fabric switch 2008b. For example, the redundant connections can be configured to failover from the first fabric switch 2008a to an alternative, active second fabric switch 2008b when a failure is detected at the first fabric switch 2008a. The redundant connections provide multiple alternative paths between the hosts 2002a, 2002b and memory devices 2006a, 2006b, and 2006c.

A first redundant connection with a failover path 2050a extends from a first switch core 2022a to a USP 2052a in the first fabric switch 2008a and extends from the USP 2052a to a DSP 2054b in the second fabric switch 2008b and extends from the DSP 2054b to a second switch core 2022b. A second redundant connection with a failover path 2050b extends from a second switch core 2022b to a USP 2052b in the second fabric switch 2008b and extends from the USP 2052b to the DSP 2054a in the first fabric switch 2008a and extends from the DSP 2054a to the first switch core 2022a.

The switch core 2022a, 2022b can be configured to alter the routing of the data packets, so all requests are sent to the correct fault tolerant engines 2026a, 2026b, 2026c, 2026d, 2026e, 2026f. When a failure occurs in one fabric switch, the switch core 2022a, 2022b can alter the routing of the data packets to an active fabric switch using one or more of the redundant connections. In an embodiment, all data packets can be transmitted via a single redundant connection. In embodiments, one or both of the redundant connections can be configured to carry bidirectional traffic. In such embodiments, a portion of the data packets can be transmitted via the first redundant connection and the remaining portion of the data packets can be transmitted via the second redundant connection.

In FIG. 20, fault tolerant engines 2026a, 2026b, 2026c, 2026d, 2026e, 2026f are provided downstream of DSPs 2030a, 2030b, 2030c, 2030d, 2030e, 2030f which are coupled to switch core 2022a, 2022b, respectively. An FM 2034 connects to fault tolerant engines 2026a, 2026b, 2026c, 2026d, 2026e, 2026f. As discussed above, the FM 2034 is configured as the management service to support the management of the network of the fabric switches 2008*a*, 2008*b*. memory devices 2006*a*, 2006*b*, and 2006*c* can be configured by the FM 2034 via the set of commands defined in an FM API.

During normal operation, the redundant connections with failover paths 2050*a*, and 2050*b* are disabled providing no traffic over the failover paths 2050*a*, and 2050*b*. Specifically, during normal operation, the failover paths 2050*a*, 2050*b* can be set to an idle state. As such, traffic from the host 2002*a*, 2002*b* routes directly through the respective fabric switches 2008*a*, 2008*b* to memory devices 2006*a*, 2006*b*, 2006*c*.

However, upon a failover event such as when one of the fabric switches 2008*a*, 2008*b* fails or components and/or connections in one of the fabric switches 2008*a*, 2008*b* fail, the flow path is reconfigured by the system such that the failover paths 2050*a*, 2050*b* are reconfigured to enable traffic to flow between fabric switch 2008*a* and fabric switch 2008*b*. Specifically, when one of the fabric switches fails, the cluster of devices 2006*a*, 2006*b*, and 2006*c* can be rebooted. Also, when a device fails or the device to switch link fails, the redundant connections with failover paths 2050*a*, 2050*b* enables the system to function to keep the cluster running.

FIG. 21 illustrates a flow chart of an exemplary method 2100 of practicing an embodiment of the present disclosure. In block 2102, the method 2100 includes at least one group of memory devices wherein, for a destination address in a memory request, one of the devices is a target device and another one of the devices is a parity device. In block 2104 the method 2100 includes providing at least one fabric (i) coupled to the at least one group of memory devices and at least one host and (ii) comprising a memory switch including at least one fault tolerant engine coupled to each of the memory devices in the at least one group of memory devices.

At decision node 2106, if one of the memory devices is broken during a read access, the fault tolerant engine performs (i) read access and (ii) read recovery in block 2108. If decision node 2106 determines the operation is not a read access, for example one of the memory devices is broken during a write access, the fault tolerant engine performs (i) a write access including updating data of the target device and parity data of the parity device atomically and (ii) write recovery in block 2110.

Block 2112 of the method 2100 includes providing at least one routing processor (i) coupled to the memory switch and (ii) configured to determine a path for the memory request received from the at least one host to the target device and directing the memory request to the target device.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer).

For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code).

A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application-specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

All numerical values, for example, for the systems are exemplary and may be other numerical values, which are not limited by the examples provided in the present disclosure.

As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion and not a restrictive one.

A combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:

at least one group of memory devices including data devices, wherein for a destination address in a memory request, one of the memory devices is a target device and another one of the memory devices is a parity device;

the at least one group of memory devices and at least one host coupled to a memory switch;

the memory switch including:

at least one fault tolerant engine coupled to the at least one group of memory devices configured to perform: (i) read access, and (ii) read recovery if one of the memory devices is broken during the read access; or (i) write access including updating data of the target device and parity data of the parity device atomically and (ii) write recovery if one of the memory devices is broken during the write access;

at least one routing processor (i) coupled to the memory switch and (ii) configured to determine a path for the memory request received from the at least one host to the target device and directing the memory request to the target device;

wherein when one of the memory devices is broken during the write access, the fault tolerant engine is configured to execute an atomic write access by:

(i) locking an entire parity group of lines containing the target device to prevent a subsequent write access request to the target device from accessing the target device while the fault tolerant engine is writing to the target device; and (ii) unlocking the entire parity group of lines when the write access is complete so that the subsequent write access request can be performed;

wherein the fault tolerant engine is configured to generate new data by performing the atomic write access and a partial cache line write operation; and wherein the partial cache line write operation prevents a portion of existing data from being overwritten by the new data when the new data is written to the target device.

2. The system of claim 1, wherein the read recovery is performed when one of the memory devices is broken, the at least one fault tolerant engine atomically reconstructs the data by:

locking locations in the memory device associated with the parity data to provide fault tolerance to prevent a subsequent read or write request from accessing the parity data; and unlocking the locked locations in the memory device when a rebuild operation is completed so that the subsequent read or write requests can be performed.

3. The system of claim 2, wherein the rebuild operation executes an atomic read access operation comprising:

forwarding requested data to a requesting host if the target device responds to a read access request from the requesting host with a valid data response; or executing an atomic read access operation via the fault tolerant engine if the target device responds to the read access request with a poison response or a timeout response, the executing including:

locking a cache line of the parity device;

reading existing data from data lines of other data devices of the at least one group;

calculating a regenerated target line value by performing an exclusive-OR (XOR) operation on check data of the parity device and the data from the data lines of the other data devices;

writing the regenerated target line value to the target device;

sending the regenerated target line value to the requesting host; and writing the check data to the cache line and unlocking the cache line.

4. The system of claim 1, further comprising:

a hot spare device previously configured such that metadata tags an entire line of the hot spare device as invalid;

a software device coupled to a memory that includes instructions for controlling operation of the at least one fabric;

wherein the software device receives notification of the single device failure from the fault tolerant engine responsive to a single device failure detected by the fault tolerant engine; and wherein the software device replaces the single failed device with the hot spare device such that subsequent read and write accesses regenerate data previously stored on the single failed device to the hot spare device.

5. The system of claim 4, wherein the fault tolerant engine is configured to perform a rebuild operation to reconstruct data in response to detecting (i) a single memory device failure per group of devices or (ii) a failure of one or more switch links connected to a memory device.

6. The system of claim 5, further comprising a fabric manager configured to execute stored instructions to:

scan metadata contents of the at least one group of devices using a quick consistency recovery process to recover from a switch failure; and access metadata bits from the parity device, and data bits from the parity device and data bits from each data device;

wherein the metadata bits in the parity device define a parity state; and wherein the parity state of the parity device is an idle state, a lock state, or an invalid state.

7. The system of claim 6, wherein the fabric manager is configured to determine whether the metadata bit of the parity device is set to the lock state; and wherein when the parity state of the parity device is not set to the lock state, the fabric manager omits checking for consistency between other data devices of the at least one group and the parity device, and no further action is taken.

8. The system of claim 6, wherein the fabric manager is configured to determine whether the metadata bit of the parity device is set to the lock state;

wherein when the parity state of the parity device is set to the lock state, a consistency check is performed to determine if data of the parity device equals the XOR of all data of other data devices of the at least one group, and wherein when the data of the parity device equals the XOR of all the data of the data devices, the fabric manager clears the lock and rewrites the parity data.

9. The system of claim 6, wherein the fabric manager is configured to determine whether the metadata bit of the parity device is set to the lock state;

wherein when the parity state of the parity device is set to the lock state, a consistency check is performed to determine if data of the parity device does not equal the XOR of all data of the other data devices of the at least one group, and wherein when the data of the parity device does not equal the XOR of all the data of the data devices, the fabric manager clears the lock and writes new parity data generated from the XORing of all the data.

10. The system of claim 6, wherein the metadata bits include poisoned metadata bits.

11. The system of claim 1, further comprising:

a hot spare device previously configured such that metadata tags an entire line of the hot spare device as invalid;

a fabric manager coupled to the at least one fabric and configured to manage operation of the at least one fabric; and the fabric manager configured to decide to swap in the hot spare device for a failed device.

12. The system of claim 1, further comprising:

a fabric manager coupled to the at least one fabric and configured to manage operation of the at least one fabric;

at least one device configured as a self-diagnosing data device that sends a ready-to-be-replaced warning to the fabric manager when one or more detected errors exceed a predetermined threshold indicating an impending failure of a ready-to-be-replaced device;

in response to the warning, the fabric manager is configured to:

preemptively add a hot spare device as a new data device;

update the fault tolerant engine, wherein each fault tolerant engine maintains a record of the hot spare device location for the group of devices;

instruct all tenants in the group of devices to perform a hot spare device data reconstruction to rebuild data to the new data device before the impending failure occurs by each tenant reading a location of its respective shared memory device;

update the fault tolerant engine; and remove the ready-to-be-replaced device.

13. A non-transitory computer readable medium having stored thereon computer executable instructions that, if executed by a computing device, cause the computing device to perform a method for use by a memory controller of a memory system including:

at least one group of memory devices;

wherein for a destination address in a memory request, one of the devices is a target device and another one of the devices is a parity device;

at least one fabric (i) coupled to the at least one group of memory devices and at least one host and (ii) comprising:

a memory switch including at least one fault tolerant engine coupled to each of the memory devices in the at least one group, the method comprising:

performing (i) read access, and (ii) read recovery if one of the memory devices is broken during the read access; or performing (i) write access including updating data of the target device and parity data of the parity device atomically and (ii) write recovery if one of the memory devices is broken during the write access;

wherein at least one routing processor coupled to the memory switch is configured to determine a path for the memory request received from the at least one host to the target device and directing the memory request to the target device;

wherein when one of the memory devices is broken during the write access, the fault tolerant engine is configured to execute an atomic write access operation by:

(i) locking an entire parity group of lines containing the target device to prevent a subsequent write access request to the target device from accessing the target device while the fault tolerant engine is writing to the target device; and (ii) unlocking the entire parity group of lines when the write access is complete so that the subsequent write access request can be performed;

wherein the fault tolerant engine is configured to generate new data by performing the atomic write access operation and a partial cache line write operation; and wherein the partial cache line write operation prevents a portion of existing data from being overwritten by the new data when the new data is written to the target device.

14. The non-transitory computer readable medium of claim 13, wherein the read recovery is performed when one of the memory devices is broken, the at least one fault tolerant engine atomically reconstructs the data by:

locking locations in the memory device associated with the parity data to provide fault tolerance to prevent a subsequent read or write request from accessing the parity data; and unlocking the locked locations in the memory device when a rebuild operation is completed so that the subsequent read or write requests can be performed.

15. The non-transitory computer readable medium of claim 14, wherein the rebuild operation executes an atomic read access operation comprises:

forwarding requested data to a requesting host if the target device responds to a read access request from the requesting host with a valid data response; or executing an atomic read access operation via the fault tolerant engine if the target device responds to the read access request with a poison response or a timeout response, the executing including:

locking a cache line of the parity device;

reading existing data from data lines of other data devices of the at least one group;

calculating a regenerated target line value by performing an exclusive-OR (XOR) operation on check data of the parity device and the data from the data lines of the other data devices;

writing the regenerated target line value to the target device;

sending the regenerated target line value to the requesting host; and writing the check data to the cache line and unlocking the cache line.

16. The non-transitory computer readable medium of claim 13, wherein the memory system further comprises:

providing a hot spare device previously configured such that metadata tags an entire line of the hot spare device as invalid; and providing instructions, for a software device coupled to a memory, for controlling operation of the at least one fabric, the method further comprising;

receiving, via the software device, notification of the single device failure from the fault tolerant engine responsive to a single device failure detected by the fault tolerant engine; and replacing, via the software device, the single failed device with the hot spare device such that subsequent read and write accesses regenerate data previously stored on the single failed device to the hot spare device.

17. The non-transitory computer readable medium of claim 16, further comprising configuring the fault tolerant engine to perform a rebuild operation to reconstruct data in response to detecting (i) a single memory device failure per group of devices or (ii) a failure of one or more switch links connected to a memory device.

18. The non-transitory computer readable medium of claim 17, further comprising providing a fabric manager configured to execute stored instructions to:

scan metadata contents of the at least one group of devices using a quick consistency recovery process to recover from a switch failure; and access metadata bits from the parity device, and data bits from the parity device and data bits from each data device;

wherein the metadata bits in the parity device define a parity state; and wherein the parity state of the parity device is an idle state, a lock state, or an invalid state.

19. The non-transitory computer readable medium of claim 18, further comprising configuring the fabric manager to determine whether the metadata bit of the parity device is set to the lock state; and wherein when the parity state of the parity device is not set to the lock state, the fabric manager omits checking for consistency between other data devices of the at least one group and the parity device, and no further action is taken.

20. The non-transitory computer readable medium of claim 18, further comprising configuring the fabric manager to determine whether the metadata bit of the parity device is set to the lock state;

wherein when the parity state of the parity device is set to the lock state, a consistency check is performed to determine if data of the parity device equals the XOR of all data of data devices of the at least one group, and wherein when the data of the parity device equals the XOR of all the data of the data devices, the fabric manager clears the lock and rewrites the parity data.

21. The non-transitory computer readable medium of claim 18, further comprising configuring the fabric manager to determine whether the metadata bit of the parity device is set to the lock state;

wherein when the parity state of the parity device is set to the lock state, a consistency check is performed to determine if data of the parity device does not equal the XOR of all data of the other data devices of the at least one group, and wherein when the data of the parity device does not equal the XOR of all the data of the data devices, the fabric manager clears the lock and writes new parity data generated from the XORing of all the data.

22. The non-transitory computer readable medium of claim 18, wherein the metadata bits include poisoned metadata bits.

23. The non-transitory computer readable medium of claim 13, further comprising tagging an entire line of the hot spare as invalid via metadata tags of a hot spare device;

coupling a fabric manager configuring a fabric manager to the at least one fabric, the fabric manager configured to manage operation of the at least one fabric; and configuring the fabric manager to decide to swap in the hot spare device for a failed device.

24. The non-transitory computer readable medium of claim 13, further comprising:

coupling a fabric manager to the at least one fabric to manage operations thereof;

at least one device configured as a self-diagnosing data device that sends a ready-to-be-replaced warning to the fabric manager when one or more detected errors exceed a threshold indicating an impending failure of a ready-to-be-replaced device;

in response to the warning, the fabric manager is configured to:

preemptively add a hot spare device as a new data device;

update the fault tolerant engine, wherein each fault tolerant engine maintains a record of the hot spare device location for the group of devices;

instruct all tenants in the group of devices to perform a hot spare device data reconstruction to rebuild data to the new data device before the impending failure occurs by each tenant reading a location of its respective shared memory device;

update the fault tolerant engine; and remove the ready-to-be-replaced device.

25. A method utilizing one or more processors and one or more memories, the method comprising:

providing at least one group of memory devices;

wherein, for a destination address in a memory request, one of the devices is a target device and another one of the devices is a parity device; and providing at least one fabric (i) coupled to the at least one group of memory devices and at least one host and (ii) comprising a memory switch including at least one fault tolerant engine coupled to each of the memory devices in the at least one group or memory devices configured to perform:

(i) a read access, and (ii) read recovery if one of the memory devices is broken during the read access; or (i) write access including updating data of the target device and parity data of the parity device atomically and (ii) write recovery if one of the memory devices is broken during the write access;

providing at least one routing processor (i) coupled to the memory switch and (ii) configured to determine a path for the memory request received from the at least one host to the target device and directing the memory request to the target device;

wherein when one of the memory devices is broken during the write access, the fault tolerant engine is configured to execute an atomic write access operation by:

(i) locking an entire parity group of lines containing the target device to prevent a subsequent write access request to the target device from accessing the target device while the fault tolerant engine is writing to the target device; and (ii) unlocking the entire parity group of lines when the write access is complete so that the subsequent write access request can be performed;

wherein the fault tolerant engine is configured to generate new data by performing the atomic write access operation and a partial cache line write operation; and wherein the partial cache line write operation prevents a portion of existing data from being overwritten by the new data when the new data is written to the target device.

26. The method of claim 25, wherein the read recovery is performed when one of the memory devices is broken, the at least one fault tolerant engine atomically reconstructs the data by:

locking locations in the memory device associated with the parity data to provide fault tolerance to prevent a subsequent read or write request from accessing the parity data; and unlocking the locked locations in the memory device when a rebuild operation is completed so that the subsequent read or write requests can be performed.

27. The method of claim 26, wherein the rebuild operation executes an atomic read access operation further comprises:

forwarding requested data to a requesting host if the target device responds to a read access request from the requesting host with a valid data response; or executing an atomic read access operation via the fault tolerant engine if the target device responds to the read access request with a poison response or a timeout response, the executing including:

locking a cache line of the parity device;

reading existing data from data lines of other data devices of the at least one group;

calculating a regenerated target line value by performing an exclusive-OR (XOR) operation on check data of the parity device and the data from the data lines of the other data devices;

writing the regenerated target line value to the target device;

sending the regenerated target line value to the requesting host; and writing the check data to the cache line and unlocking the cache line.

28. The method of claim 25, wherein the memory system further comprises:

providing a hot spare device previously configured such that metadata tags an entire line of the hot spare device as invalid; and providing instructions, for a software device coupled to a memory, for controlling operation of the at least one fabric, the method further comprising;

receiving, via the software device, notification of the single device failure from the fault tolerant engine responsive to a single device failure detected by the fault tolerant engine; and replacing, via the software device, the single failed device with the hot spare device such that subsequent read and write accesses regenerate data previously stored on the single failed device to the hot spare device.

29. The method of claim 28, further comprising configuring the fault tolerant engine to perform a rebuild operation to reconstruct data in response to detecting (i) a single memory device failure per group of devices or (ii) a failure of one or more switch links connected to a memory device.

30. The method of claim 29, further comprising providing a fabric manager configured to execute stored instructions to:

scan metadata contents of the at least one group of devices using a quick consistency recovery process to recover from a switch failure; and access metadata bits from the parity device, and data bits from the parity device and data bits from each data device;

wherein the metadata bits in the parity device define a parity state; and wherein the parity state of the parity device is an idle state, a lock state, or an invalid state.

31. The method of claim 30, further comprising configuring the fabric manager to determine whether the metadata bit of the parity device is set to the lock state; and wherein when the parity state of the parity device is not set to the lock state, the fabric manager omits checking for consistency between other data devices of the at least one group and the parity device, and no further action is taken.

32. The method of claim 30, further comprising configuring the fabric manager to determine whether the metadata bit of the parity device is set to the lock state;

wherein when the parity state of the parity device is set to the lock state, a consistency check is performed to determine if data of the parity device equals the XOR of all data of other data devices of the at least one group, and wherein when the data of the parity device equals the XOR of all the data of the data devices, the fabric manager clears the lock and rewrites the parity data.

33. The method of claim 30, further comprising configuring the fabric manager to determine whether the metadata bit of the parity device is set to the lock state;

wherein when the parity state of the parity device is set to the lock state, a consistency check is performed to determine if data of the parity device does not equal the XOR of all data of other data devices of the at least one group, and wherein when the data of the parity device does not equal the XOR of all the data of the data devices, the fabric manager clears the lock and writes new parity data generated from the XORing of all the data.

34. The method of claim 30, wherein the metadata bits include poisoned metadata bits.

35. The method of claim 25, further comprising tagging an entire line of the hot spare as invalid via metadata tags of a hot spare device;

coupling a fabric manager configuring a fabric manager to the at least one fabric, the fabric manager configured to manage operation of the at least one fabric; and configuring the fabric manager to decide to swap in the hot spare device for a failed device.

36. The method of claim 25, further comprising:

coupling a fabric manager to the at least one fabric to manage operations thereof;

providing at least one device configured as a self-diagnosing data device that sends a ready-to-be-replaced warning to the fabric manager when one or more detected errors exceed a predetermined threshold indicating an impending failure of a ready-to-be-replaced device;

in response to the warning, the fabric manager is configured to:

preemptively add a hot spare device as a new data device;

update the fault tolerant engine, wherein each fault tolerant engine maintains a record of the hot spare device location for the group of devices;

instruct all tenants in the group of devices to perform a hot spare device data reconstruction to rebuild data to the new data device before the impending failure occurs by each tenant reading a location of its respective shared memory device;

update the fault tolerant engine; and remove the ready-to-be-replaced device.

\*  \*  \*  \*  \*